(12) United States Patent
Polk et al.

(10) Patent No.: US 7,826,454 B2
(45) Date of Patent: Nov. 2, 2010

(54) METHOD AND APPARATUS FOR DOMAIN AND SUBDOMAIN ESTABLISHMENT FOR PREEMPTION

(75) Inventors: James M. Polk, Colleyville, TX (US); Subhasri Dhesikan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 474 days.

(21) Appl. No.: 11/824,585

(22) Filed: Jun. 29, 2007

(65) Prior Publication Data
US 2009/0003202 A1    Jan. 1, 2009

(51) Int. Cl.
*H04L 12/28* (2006.01)

(52) U.S. Cl. .................. 370/392; 370/235; 370/408

(58) Field of Classification Search ........... None
See application file for complete search history.

(56) References Cited

U.S. PATENT DOCUMENTS

| | | | | |
|---|---|---|---|---|
| 6,233,241 | B1 * | 5/2001 | Trossen et al. | 370/408 |
| 6,879,568 | B1 * | 4/2005 | Xu et al. | 370/321 |
| 6,973,035 | B2 * | 12/2005 | Seddigh et al. | 370/235 |
| 7,489,687 | B2 * | 2/2009 | Chavez et al. | 370/392 |
| 2009/0097403 | A1 * | 4/2009 | Polk et al. | 370/231 |

OTHER PUBLICATIONS

Herzog, S., "Signaled Preemption Priority Policy Element," RFC 3181, pp. 1-12, Oct. 2001.
Braden, R. et al., "Resource ReSerVation Protocol (RSVP), Version 1 Functional Specification,"RFC # 2205, Network Working Group [Online] [retrieved on Nov. 5, 2009] Retrieved from: http://tools.ietf.org/html/rfc2205; pp. 1-113 (1997).
Hancock et al., "Next Steps in Signaling (NSIS): Framework," RFC # 4080, Network Working Group, pp. 1-50 (2005).
Herzog, S., "RSVP Extensions for Policy Control," RFC # 2750, Network Working Group, pp. 1-14 (2000).
Shenker, S. and Wroklawski, J., "General Characterization Parameters for Integrated Service Network Elements," RFC # 2215, Network Working Group, pp. 1-17 (1997).
Durham, D. et al., "The COPS (Common Open Policy Service) Protocol," RFC # 2748, Network Working Group, pp. 1-39 (2000).
Baker, F. et al., "RSVP Cryptographic Authentication," RFC # 2747, Network Working Group, pp. 1-22 (2000).

* cited by examiner

*Primary Examiner*—Robert W Wilson
(74) *Attorney, Agent, or Firm*—Hamilton, Brook, Smith & Reynolds, P.C.

(57) ABSTRACT

In one embodiment, a method and corresponding apparatus, in a network, treat a reservation for network layer resources according to a domain of reservation treatment to which the reservation belongs.

20 Claims, 16 Drawing Sheets

Reservation treated according to domain of reservation treatment to which reservation belongs:

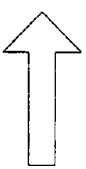

Ex.: Reject reservation 225

Previous installed reservations:
- Installed reservation-1 (240a); Domain-id = A; Priority value = 1
- Installed reservation-2 (240b); Domain-id = A; Priority value = 1
- Installed reservation-3 (240c); Domain-id = B; Priority value = 1
- Installed reservation-4 (240d); Domain-id = B; Priority value = 3

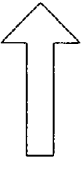

Treating reservation according to domain of reservation treatment to which reservation belongs:

Ex.: Reservation (225); Domain-id = A (230); Priority value = 1 (235)

FIG. 2B

METHOD AND APPARATUS FOR DOMAIN AND SUBDOMAIN ESTABLISHMENT FOR PREEMPTION

TECHNICAL FIELD

The present disclosure relates generally to reservations for network layer resources.

BACKGROUND

In a network, network layer resources, such as bandwidth and other resources associated with the Network Layer (layer 3 or L3) of the Open Systems Interconnection Reference Model (OSI-RM) are limited. Demand for resources often outpaces supply. Network layer control protocols address this issue of supply and demand by reserving network layer resources necessary to provide network layer services, such as constant data rate and low-delay data transport, for real-time data transmission or communication, such as voice over Internet Protocol (IP) (VoIP) or video on demand (VoD). But again because network layer resources are limited, resources may not be available for each and every reservation requested. This is a case of offered load exceeding network link (or interface) capacity. As such, reservation protocols, such as Resource ReSerVation Protocol (RSVP) (defined in R. Braden, et al., "Resource ReSerVation Protocol (RSVP)," Request For Comments (RFC) 2205), often support preemption and prioritization of reservations.

Preemption of reservations generally relates to preempting an existing lower priority (preference) reservation in order to reallocate its resources to a new higher priority reservation. Prioritization of reservations generally relates to a priority given to a reservation with respect to allocating resources to the reservation over other reservations. Implementing reservation preemption and/or prioritization across an entire network, such as the Internet, however, is a difficult proposition at best.

The Internet is a loose confederation of networks controlled by many individual and separate entities and organizations—not just one. It is unlikely all will ever agree as to which reservation preempts or is preferred over another reservation. To do so, would permit one organization to dictate how scarce network layer resources are reserved by another organization. These policy decisions on what or which traffic deserves which packet treatment within a particular domain (or network) are matters for that local domain to make. Sometimes, two adjacent domains can agree on similar treatments for a type of traffic, but this is rare, and not expected to change soon.

BRIEF DESCRIPTION OF THE DRAWINGS

Illustrated in the accompanying drawings are example embodiments in which like reference characters refer to the same parts throughout the different views. The drawings are not necessarily to scale, emphasis instead being placed upon illustrating example embodiments.

FIGS. 2A-2C are block diagrams of a reservation for network layer resources treated according to a domain of reservation treatment to which the reservation belongs;

DESCRIPTION OF EXAMPLE EMBODIMENTS

Overview

Example embodiments, in a network, treat a reservation for network layer resources according to a domain of reservation treatment to which the reservation belongs.

It is unlikely that all organizations will ever agree to a linear prioritization of data flows (i.e., prioritizing flows across an entire network) because linear prioritization will allow a reservation for network layer resources from one organization to preempt or to be preferred over a reservation from another organization. Accordingly, a method and corresponding apparatus for treating a reservation for network layer resources according to a domain of reservation treatment within a network is provided.

Additionally, a method for reserving network layer resources requested in a reservation according to a sub-domain of reservation treatment within a domain of reservation treatment within a network is also provided.

Figure 1:
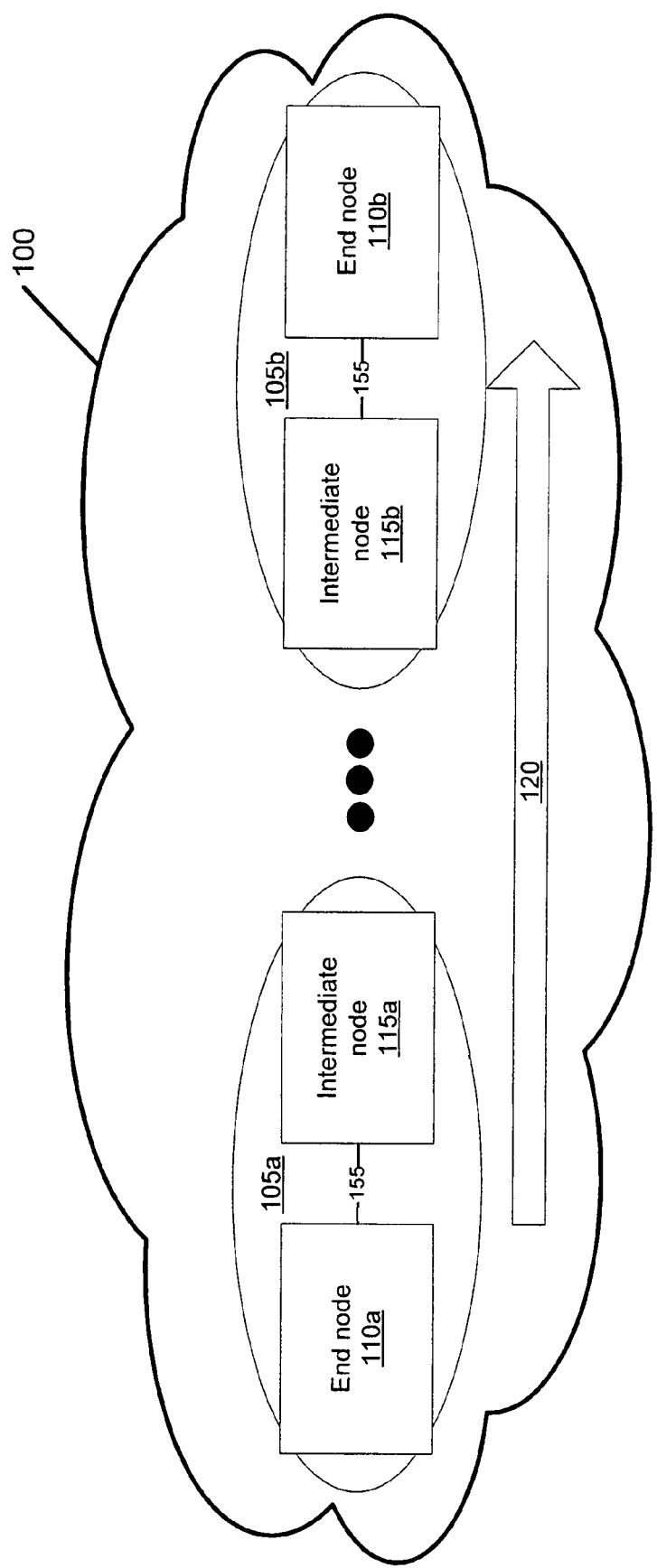
FIG. 1 is a block diagram of an example data network.

FIG. 1 is a high-level block diagram of an example data network 100 that may employ embodiments of the present invention. The data network 100 includes a collection of communications links 155 connected to a plurality of nodes, such as end nodes 110 and intermediate nodes 115, to form an internetwork of nodes. These internetworked nodes communicate by exchanging data packets according to a predefined set of protocols, such as Transmission Control Protocol/Internet Protocol (TCP/IP). In this context, a protocol consists of a set of rules defining how nodes interact with each other.

The data network 100 further includes a data flow 120 from a first end node 110a to a second end node 110b. The data flow 120 is a sequence of datagrams that have a same source and destination (regardless of whether that destination is on one or more physical machines). Within the data flow 120 the datagrams are interchanged by participating entities (e.g., the end nodes 110 and the intermediate nodes 115) in a specified manner or per a service. For example, the datagrams are delivered from a source to a destination reliably, regardless of the amount of time needed to accomplish delivery. The service associated with the data flow 120 is provided by reserving network layer resources for the data flow 120.

Network layer resources, such as bandwidth, are limited. In any data network, demand for network layer resources often outpaces supply. Consequently, not every data flow can be allocated network layer resources necessary to provide service associated with a data flow. In such a situation, congestion control mechanisms, such as the one within Transport Control Protocol (TCP), may be used to adjust the transmission rate at an ingress node depending on how much traffic a network can handle. For example, a congestion control mechanism reduces (or backs-off) the transmission rate at an ingress node in an event a network cannot handle an existing rate of transmission. Conversely, the congestion control mechanism increases the transmission rate at the ingress node in an event the network can handle more than the existing rate of transmission. Accordingly, in some instances and to some degree (described below), a congestion control mechanism may be used to allocate network layer resources necessary to provide service associated with a data flow.

However, in some instances, a congestion control mechanism may not be used to allocate network layer resources necessary to provide service associated with a data flow. For example, in instances where a congestion control mechanism is lacking or otherwise absent. User Datagram Protocol (UDP) contrasted with TCP has no congestion control mechanisms, and relies solely on a network to ensure packets are delivered as expected. Application (and network) engineers take this limitation into account when choosing which transport layer protocol (i.e., TCP or UDP) to use, based on expected characteristics of an underlying network.

One way around this lack of congestion control within UDP is to reserve bandwidth (and/or other network layer resources) needed for a particular UDP transmission. Network layer resources may be reserved using a network layer reservation protocol, such as Resource ReSerVation Protocol (RSVP).

Typically, RSVP is used to reserve network layer resources for real-time communications, such as voice of IP (VoIP), contrasted with non-real-time communications, such as web-browsing. Real-time communications expect there to be a predictable inter-packet gap between consecutively transmitted packets at a source, and received by a destination. Variations in inter-packet gaps are often measured as jitter, i.e., a measure of the variability over time of latency across a network. To ensure this inter-packet gap remains constant, or nearly constant (i.e., low jitter), a technique of prioritizing these reserved packet flows over other flows is often necessary.

While RSVP is often used to reserve network layer resources for UDP transmissions (i.e., transmissions without congestion control), and in particular real-time communications, such as VoIP, it should be noted RSVP may also be used to reserve resources needed for a particular TCP transmission or session.

This problem of reserving limited network layer resources for data flows is addressed partly by the notion of a priority. For example, network layer resources are reserved for a data flow of high priority, but not for a data flow of low priority. However, in a data network, such as the Internet, the applicability and practicality of priority may be limited.

As noted above, the Internet is a loose confederation of data networks. No one organization controls the Internet as a whole. Instead, there is a myriad of individual organizations, each overseeing a portion of the Internet. Therefore, it stands to reason each organization, in overseeing their portion, seeks to control how precious network layer resources are allocated, and in particular, to which data flows the resources are allocated.

For example, in FIG. 1, control of the data network 100 is "divided" amongst a first organization 105a and a second organization 105b (generally 105). The first organization 105a exercises control over network elements, such as the first end node 110a and a first intermediate node 115a. Similarly, the second organization 105b exercises control over network elements, such as the second end node 110b and a second intermediate node 115b. In exercising control over its network elements, the first organization 105a does not want network layer resources allocated to the first end node 110a to be reallocated by the second organization 105b to the second end node 110b, and vice versa.

Reserving network layer resources solely on a priority basis, however, would allow one organization to dictate how another organization reserves its network layer resources. For example, if a first priority value of a first reservation from the first end node 110a preempts a second priority value of a second reservation from the second end node 110b, then network layer resources are reallocated to the first end node 110a from the second end node 110b.

Accordingly, there is a need to provide a meaning to priority which goes beyond merely reserving network layer resources first for a high priority data flow and then for a low priority data flow.

Before proceeding with a detailed description of embodiments of the present invention, it is necessary to distinguish network layer resources from other resources, such as application layer resources. Network layer resources, such as bandwidth, are resources corresponding to the network layer (layer 3) of the OSI-RM. In contrast, application layer resources are associated with the application layer (layer 7) of the OSI-RM. As such, it may be said that network layer resources are associated with a network interface (e.g., IP interface) as contrasted with resources associated with a data link (e.g., an Ethernet link or an Asynchronous Transport Mode (ATM) circuit) or resources associate with an application port (e.g., Hypertext Transfer Protocol (HTTP) and Voice over IP (VoIP) applications).

Furthermore, a reservation for network layer resources is concerned with reserving resources for a data flow (e.g., a sequence of IP datagrams) between network nodes (e.g., end note-to-end node, end node-to-intermediate node, and intermediate node-to-intermediate node). In contrast, a reservation for application layer resources is concerned with reserving resources for a session or a call between applications (e.g., between a first VoIP caller and a second VoIP caller).

Figure 2A:
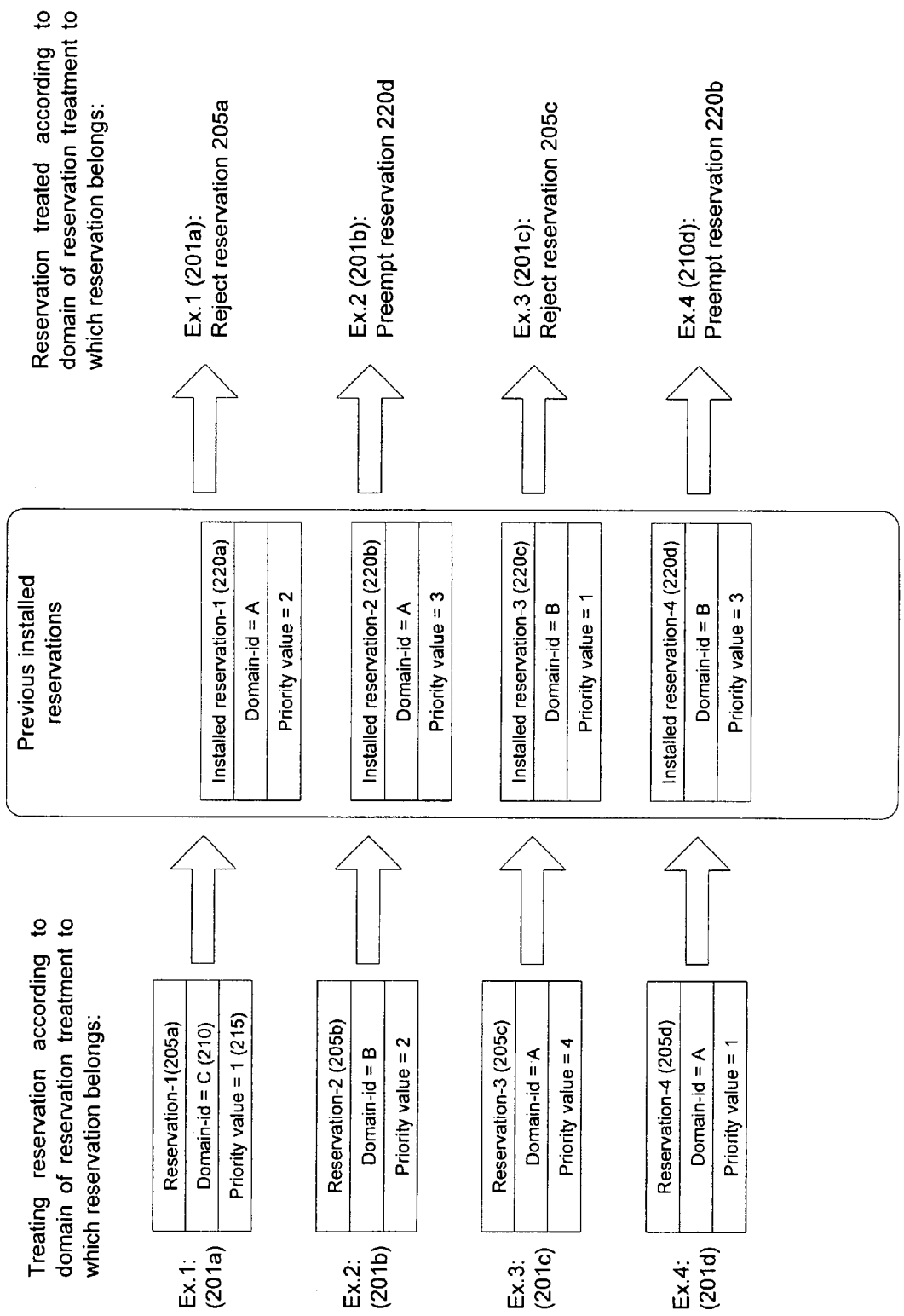

In FIG. 2A, example reservations for network layer resources 205a . . . 205d (generally 205) are treated according to domain of reservation treatments to which the reservations belong.

In a first example 201a, a first reservation for network layer resources 205a has a domain identifier 210 of "C," identifying the first reservation 205a as belonging to the "C domain of reservation treatment." The first reservation 205a has a priority value 215 of "1." In this example, a reservation with a lower-numbered priority value preempts (i.e., is of a "greater priority") a reservation with a higher-numbered priority value (i.e., is of a "lesser priority"). For example, a reservation with a priority value of "2" preempts a reservation with a priority value of "3," but not a reservation with a priority value of "1." Similarly, a reservation with a lower-numbered priority value is preferred over a reservation with a higher-numbered priority value.

The first reservation for network layer resources 205a represents network layer resources to be reserved or otherwise requested to be reserved. Network layer resources already reserved or otherwise allocated are represented by previously installed reservations 220a . . . 220d (generally 220). The previously installed reservations 220 have domain identifiers and priority values illustrated in FIG. 2A.

For this example and for illustration purposes all network layer resources are reserved by the previously installed reservations 220. That is, a capacity of a network is reached and there are no more network layer resources available. As such, installing or otherwise reserving network layer resources per the first reservation 205a requires reallocating network layer resources from one or more previously installed reservations 220.

Continuing with the first example 201a, the first reservation 205a is rejected because there are no previously installed reservations belonging to the same domain of reservation treatment (namely, the "C domain of reservation treatment"), from which network layer resources can reallocated. The first reservation 205a cannot preempt, for example, the previously installed reservation 220a because the previously installed reservation 220a belongs to a different domain of reservation treatment, namely, the "A domain of reservation treatment." The first reservation 205a cannot preempt any previously installed reservations belonging to domain of reservation treatments other than the "C domain of reservation treatment." This holds true and the result remains the same regardless of the priority value of the first reservation 205a. As such, in the first example 201a, there are no previously installed reservations 220 from which network layer resources can be reallocated install the first reservation 205a and, thus, the first reservation 205a is rejected.

In a second example 201b, a second reservation for network layer resources 205b with a domain identifier of "B" and a priority value of "2" preempts the previously installed reservation 220d because the domain identifier of both reservations 205b and 220d belong to a same domain of reservation treatment (namely, the "B domain of reservation treatment") and the priority value of the second reservation 205b is of greater priority (in this example, lower-numbered) then the previous installed reservation 220d. As such, network layer resources are reallocated from the previously installed reservation 220d to the second reservation 205b.

In contrast with first example 201a, in the second example 201b, there are previously installed reservations belonging to the same domain of reservation treatment as the second reservation 205b (namely, the previously installed reservations 220c and 220d) and, as such, there are previously installed reservations from which network layer resources can be reallocated. Having determined that there are network layer resources available to be reallocated, it is then determined from which previously installed reservations to reallocate network layer resources. A variety of techniques for determining which previously installed reservations is preempted may be used, e.g., "round-robin" or a weighted selection process.

In the second example 201b, a preempted previously installed reservation is determined by comparing the priority value of the second reservation 205b with the priority values of the previously installed reservations belonging to the same domain of reservation treatment as the second reservation 205b (namely, the previously installed reservations 220c and 220d). The priority value for the second reservation 205b is of a lesser priority (as described above) that the priority value for the previously installed reservation 220c, but is of a greater priority (as described above) the previously installed reservation 220d. As such, the second reservation 205b preempts the previously installed reservation 220d and network layer resources are reallocated to the second reservation 205b from the previously installed reservation 220d.

In a third example 201c, a third reservation of network layer resources 205c with a domain identifier of "A" and priority value of "4" is rejected because the priority value of the third reservation 205c is of lesser priority than the priority values of the previously installed reservations, namely, the previously installed reservation 220a and 220b, belonging to a same domain of reservation treatment as the third reservation 205c.

In a fourth example 201d, a fourth reservation for network layer resources 205d with a domain identifier of "A" and priority value of "1" preempts the previous installed reservation 220b because the fourth reservation 205d and the previously installed reservation 220b both belong to a same domain reservation treatment and the priority value of the reservation 220d is of a greater priority than the priority value of the previously installed reservation 220b.

Note that the priority value of the fourth reservation 205d is also of greater priority than the priority value of the previous installed reservation 220a. As such, the fourth reservation 205d also preempts the previously installed reservation 220a. In an event there are two or more priority values of lesser priority, the priority value of "least priority" is be preempted. In the fourth example 201d, a priority value of "3" is of lesser priority than a priority value of "2" or "1," and, as such, the priority value of "3" is of least priority. Whether a previously installed reservation with a priority value of least priority or a lesser priority is preempted in the event there are two or more priority values of lesser priority is particular to specific implementation of example embodiments. One of ordinary skill in the art will readily recognize that principles of the present invention are not limited by such a specific implementation.

In FIG. 2B, an example reservation for network layer resources 225 is treated according to a domain of reservation treatment to which the reservation belongs. The reservation 225 has a domain identifier 230 of "A" identifying the reservation 225 as belonging to the "A domain of reservation treatment." The reservation 225 has a priority value 335 of "1" (described in reference to FIG. 2A).

The reservation for network layer resources 225 represents network layer resources to be reserved or otherwise requested to be reserved. Network layer resources already reserved or otherwise allocated are represented by previously installed reservations 240a ... 240d (generally 220). The previously installed reservations 240 have domain identifiers and priority values illustrated in FIG. 2B.

For this example and for illustration purposes all network layer resources are reserved by the previously installed reservations 240. That is, a capacity of a network is reached and there are no more network layer resources available. As such, installing or otherwise reserving network layer resources per the reservation 225 requires reallocating network layer resources from one or more previously installed reservations 240.

The reservation for network layer resources 225 is rejected despite the previously installed reservations 240a and 240b belonging a same domain of reservation treatment (namely, the "A domain of reservation treatment") because there are no previously installed reservations to preempt. The priority value 230 of the reservation 225 is not of a greater priority than the priority values of either the previously installed reservations 240a or 240b (i.e., a first with a priority value of "1" does not preempt (nor is it preferred over) a second reservation with a priority value of "1"). As such, the reservation 225 cannot preempt the previously installed reservations 240a and 240b In some example embodiments, in an event a priority value for a reservation for network layer resources is of a "same priority" as priority values for one or more previously installed reservations, the reservation is rejected. In other example embodiments, in an event priority values for a reservation for network layer resources and previously installed reservations are all of the "highest priority," the reservation is rejected.

Returning to the example illustrated in FIG. 2B, because the reservation 225 and the previously installed reservations 240a and 240b are of the "highest priority" (namely, a priority value of "1"), the reservation 225 is rejected. However, consider an example where the reservation 225 and the previously installed reservations 240a and 240b all have priority values of the "same priority," but not of the "highest priority," for example, a priority value of "2." In some embodiments, the reservation 225 is rejected, while in others, the reservation 225 preempts one of the previously installed reservations 240a and 240b (e.g., using round-robin or weight-based system). One of ordinary skill in the art will readily recognize such embodiments are within the contemplation of the present invention.

Figure 2C:
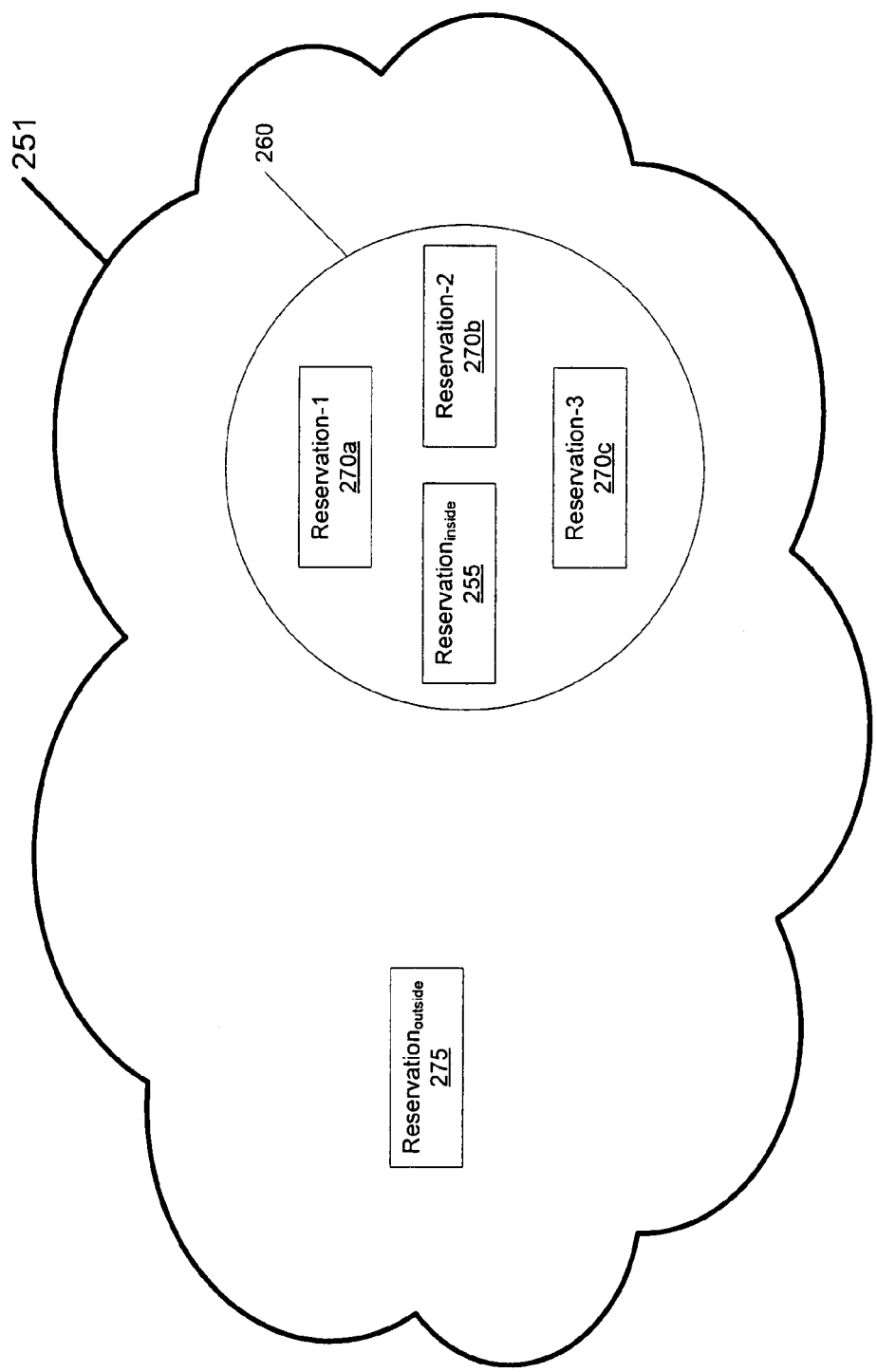

FIG. 2C further illustrates, in a network 251, a reservation 255 for network layer resources treated according to a domain of reservation treatment 260 to which the reservation 255 belongs. As defined and described below, the domain of reservation treatment 260 is contrasted with an "Internet domain" which is simply a subdivision of the Internet consisting of computers or sites usually with a common purpose, such as providing commercial information.

In one example, the reservation 255 is given the same meaning as a first reservation 270a, a second reservation 270b, and a third reservation 270c (generally 270). Because the reservation 255 originates from within the domain of reservation treatment 260, it may be said that a reservation is given the same meaning as other reservations in a domain of reservation treatment in an event the reservation originates from inside the domain.

Unlike the reservation 255, a reservation 275 for network layer resources is given a different meaning from the other reservations 270. Because the reservation 275 originates from outside the domain of reservation treatment 260, it may be said that a reservation is given a different meaning as other reservations in a domain of reservation treatment in the event the reservation originates from outside of the domain.

In another example, network layer resources are reserved according to the domain of reservation treatment 260. In this way a domain of reservation treatment provides an environment or context for evaluating, or in some instances, applying a reservation for network layer resources. Creating within a network a context for evaluating or otherwise applying a reservation for network layer resources, in one example, enables how a reservation for network layer resources impacts or otherwise interacts with other reservations to be controlled.

Unlike a domain of reservation treatment, an "Internet domain" does not provide a context for evaluating reservations for network layer resources. Rather, an Internet domain, such as .com or .gov, merely identifies a subdivision of the Internet consisting of computers or sites with a common purpose, namely, commerce and government.

Network layer resources, such as bandwidth, are limited, and as such prioritization and preemption of reservations for these resources are typical. Prioritization generally relates to a preference (priority) given to a reservation with respect to allocating resources to the reservation over other reservations. Preemption generally relates to preempting an existing lower priority reservation in order to re-allocate its resources to a new higher priority reservation.

It is unlikely that all organizations will ever agree to a linear prioritization and/or preemption of data flows because linear prioritization and/or preemption will allow a reservation for network layer resources from one organization to be preferred over or preempt reservations from another organization. In contrast, an organization using a domain of reservation treatment and the context it provides may ensure that reservations from another organization do not impact (or impact in a controlled and deterministic manner) the reservations of the organization.

For example, reservations from within a domain of reservation treatment with a high priority value are given priority over or preempt reservations with lower priority values. Because priority values within the context provided by a domain of reservation treatment are given the same meaning, a higher priority value is preferred over or preempts a lower priority value. In contrast, a reservation from outside a domain of reservation treatment may not be preferred over or preempt reservations with a lower value. Because a priority value outside the context provided by a domain of reservation treatment is given the same meaning, a higher priority value is not necessarily preferred over or preempts a lower priority value.

Communications typically involve a first organization and second organization. Even when communications are within one organization, communication may still traverse a second organization. In fact, communications may traverse many intermediary organizations. Creating within a network, a context for evaluating or otherwise applying a reservation for network layer resources, in one example, does not require a single continuous reservation from end-to-end.

Some embodiments of the present invention are contrasted with spanning quality of service (QoS) signaling across an entire network. In order to achieve "true end-to-end" QoS, every entity along a data path across a network, such as switches, routers, firewalls, hosts, clients, and so on, must deliver its part of QoS for a given data flow. Accordingly, true end-to-end QoS requires all entities along a data path to be coordinated with QoS signaling at the OSI layer of the mechanism or protocol providing that QoS. Because a reservation (QoS signaling) is treated according to a domain of reservation treatment within a network, there is no requirement by the present invention for QoS signaling to span across an entire network.

Some embodiments of the present invention are further contrasted with requiring border nodes (such as the intermediate nodes 115 of FIG. 1) to manipulate and translate policy based admission controls (or objects) according to established sets of bilateral agreements in order to successfully deploy admission policies across multiple administrative domains. Because a reservation is given a same or different meaning as other reservations in a domain of reservation treatment depending on whether the reservation originates from inside or outside the domain (i.e., policy), there is no requirement by the present invention to support generating consistent end-to-end policies. As such, some embodiments of the present invention do not require the exchange of admission policies between policy-capable nodes along a data path in a network.

For example, a reservation for network layer resources starts in a first domain of reservation treatment, traverses a second domain of reservation treatment, and ends in a third domain of reservation treatment. While in the first domain of reservation treatment, the reservation is given a first meaning. The reservation having egress from the first domain of reservation treatment and ingress to the second domain reservation treatment is given a second meaning. Finally, having egress from the second domain of reservation treatment, the reservation is given a third meaning upon ingress to the third domain of reservation treatment. In this way, given multiple domains of reservation treatment, a single reservation for network layer resources may be given multiple meanings as reservation traverses the domains of reservation treatment.

One of ordinary skill in the art will readily recognize that there may be one or more additional domains of reservation treatment (or sub-domains of reservation treatment) within a domain of reservation treatment creating additional sub-contexts for evaluating or applying reservation for network layer resources. Furthermore, within these additional domains of reservation treatment there may be additional domains of reservation treatment (sub-sub-domain of reservation treatments) and so on. At each "domain level," a reservation for network layer resources is treated according to a domain as described above. In this way, not only may a reservation be treated on a per organization basis, but also on a sub-organization basis within one organization.

While FIGS. 2A-2C all illustrate treating a reservation for network layer resources according to a domain of reservation treatment to which the reservation belongs, FIG. 2C is contrasted with FIGS. 2A and 2B. In FIGS. 2A and 2B, a reservation for network layer resources belongs to a domain of reservation treatment in the sense that the reservation is identified as belonging to the domain of reservation treatment. In contrast, in FIG. 2C, a reservation for network layer resources belongs to a domain of reservation treatment in the sense that the reservation is originated from the domain of reservation treatment. That is to say, a reservation identified as belong to a domain of reservation treatment may not necessarily originate from the identified domain of reservation treatment, and vice versa.

Figure 3A:
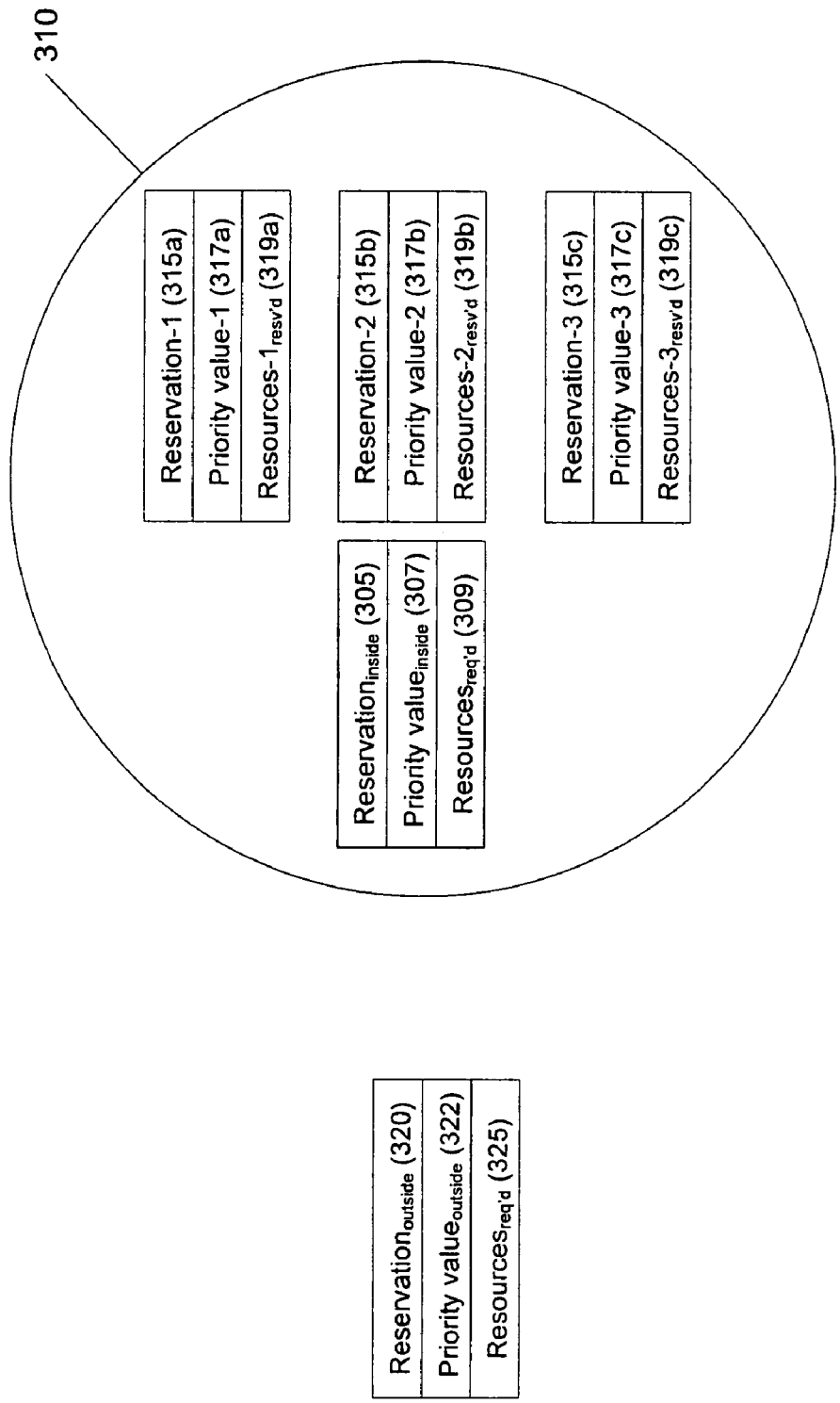
FIGS. 3A-3B are block diagrams of a reservation from inside a domain of reservation treatment given a same meaning as other reservations in the domain and a reservation from outside the domain of reservation treatment given a different meaning as the other reservations in the domain.
Figure 3B:
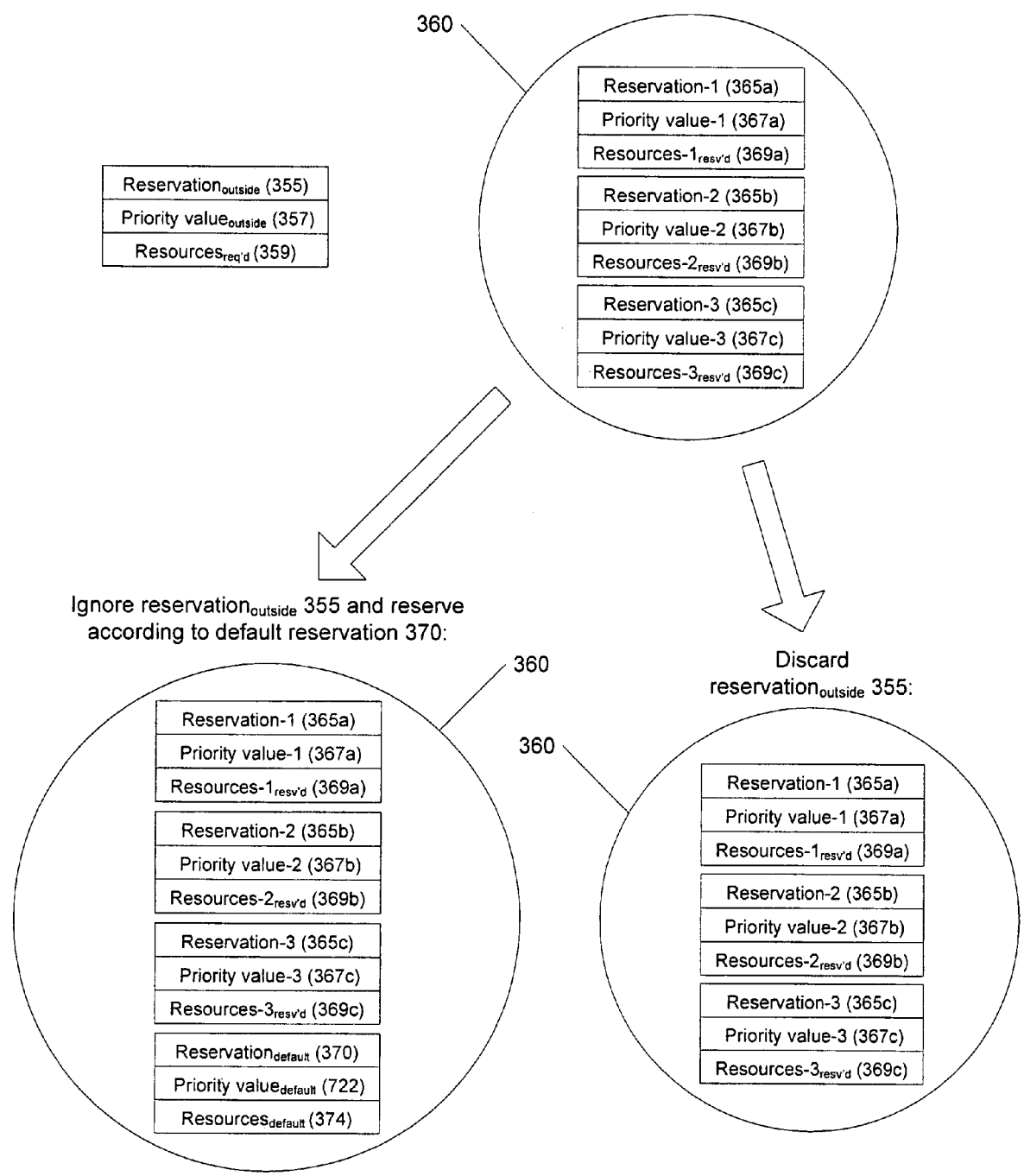

Individually, FIGS. 3A-3C illustrate separate and distinct inventive concepts. However, collectively they illustrate the overarching concept of treating a reservation for network layer resources according to a domain of reservation treatment to which the reservation belongs.

FIG. 3A illustrates a reservation 305 for network layer resources from inside a domain of reservation treatment 310 being compared to a first reservation 315a, a second reservation 315b, and a third reservation 315c (generally 315). The inside reservation 305 is being compared to determine whether the inside reservation 305, relative to the other reservations 315, preempts the other reservations 315.

In the example illustrated in FIG. 3A, the inside reservation 305 has a priority value 307 and requests that resources 309 be reserved. The other reservations 315 have a first priority value 317a, a second priority value 317b, and a third priority value 317c (generally 317). Each of the other reservations 315 reserves resources 319a, 319b, and 319c (generally 319). In this example, the inside reservation 305 preempts the other reservations 315 in an event the inside priority value 307 preempts the other priority values 317. In such an event, the requested resources 309 are attained by reallocating resources from the other reservations 315.

FIG. 3A also illustrates outside the domain of reservation treatment 310, a reservation 320 with a priority value 322 requesting resources 325 be reserved. Unlike the other priority values 317, the outside priority value 322 has no bearing on determining whether the inside reservation 305 preempts, and, thus whether the requested resources 309 should be reallocated. In this way, preemption of a reservation is relative to other reservations in a domain of reservation treatment in an event the reservation originates from inside the domain.

In another embodiment, a reservation for network layer resources from inside a domain of reservation treatment is compared to other reservations to determine whether the inside reservation, relative to the other reservations, is preferred over the other reservations. The inside reservation may have, for example, a priority value and request that resources be reserved. The other reservations may each have, for example, a priority value and reserve resources. In this example, the inside reservation is preferred over the other reservations in an event the inside priority value is preferred over the other priority values. In such an event, the requested resources are attained by allocating resources to the inside reservation over the other reservations.

FIG. 3B illustrates a reservation 355 for network layer resources from outside a domain of reservation treatment 360 being discarded and no network layer resources being reserved. Alternatively, the outside reservation 355 is ignored and network layer resources are reserved according to a default reservation 370. In an example illustrated in FIG. 3B, the domain of reservation treatment 360 includes a first reservation 365a, a second reservation 365b, and a third reservation 365c (generally 365). The outside reservation 355 has, for example, an outside priority value 357 and requests network layer resources 359 be reserved. The other reservations 365 have, for example, other priority values 367a, 367b, and 367c (generally 367) and reserve network layer resources 369a, 369b, and 369c (generally 369).

In contrast with the example of FIG. 3A, regardless of the outside priority value 357 the requested resources 359 are not reserved. Even if the outside priority value 357 is preferred over or preempts the other priority values 367 in, for example, a network, because the present invention treats reservations according to a domain of reservation treatment (contrasted with a network), the outside reservation 355 is discarded. In an alternative embodiment, the outside reservation 355 is ignored and network layer resources are reserved according to the default reservation 370 with a default priority value 372 and default resources 374 (contrasted with the requested resources 359).

In this way, a reservation from outside a domain reservation treatment (e.g., from another organization) does not effect other reservations inside in the domain of reservation treatment (e.g., resources not reserved as requested) or impacts in control and deterministic manner (e.g., resources reserved according to a default reservation).

While embodiments referring to FIGS. 3A-B are described as treating a reservation having a priority value, one skilled in the art will readily recognize reservations having other priority indicators or identifiers may also be treated in accordance with embodiments of the present invention. For example, one or more flags may be used to indicate varying priorities.

Figure 4A:
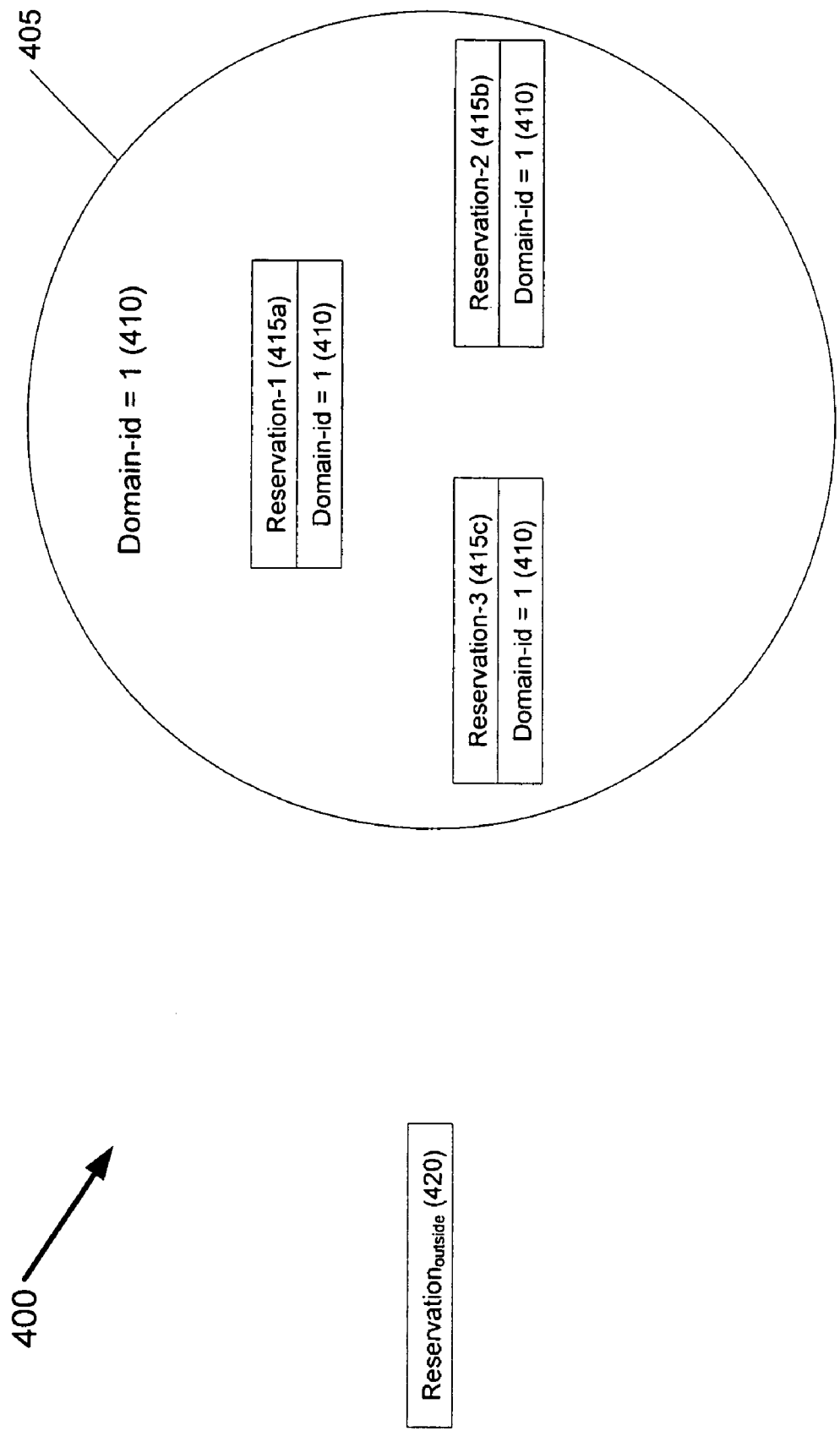
FIG. 4A-4B are block diagrams of a domain of reservation treatment defined by a domain-identifier.

FIG. 4A illustrates in an example network 400, a domain of reservation treatment 405 defined by a domain identifier 410. In this example, the domain of reservation treatment 405 is defined by the domain identifier 410 having a value of one.

The domain identifier 410 identifies reservations which are from inside the domain of reservation treatment 405. Additionally, the domain identifier 410 identifies reservations which are from outside the domain of reservation treatment 405. Consider the following example illustrated in FIG. 4A.

The domain identifier 410 identifies a first reservation 415a, second reservation 415b, and third reservation 415b (generally 415). That is, the reservations 415 all have the same domain identifier 410. As such, it may be said that a collection of reservations having a same domain identifier defines or otherwise makes up a domain of reservation treatment.

The domain identifier 410 does not, however, identify a reservation 420. In this example, the reservation 420 does not have a domain identifier. Alternatively, the reservation 420 may have a domain identifier different from the domain identifier 410. In either instance (and in contrast to the previous reservations 415), the reservation 420 is identified as being from outside the domain of reservation treatment 405. In this way, the domain of reservation treatment 405 may be further defined as excluding reservations without the domain identifier 410 or having a domain identifier different from the domain identifier 410.

In another example embodiment, the domain of reservation treatment 405 is defined by registering the domain identifier 410 to the domain of reservation treatment 405. The domain identifier 410 identifies the domain of reservation treatment 405 uniquely within the network 400 and prevents the reservations 415 belonging to the domain of reservation treatment 405 from colliding with other reservations belonging to other domains of reservation treatment in the network (e.g., the reservation 420). The domain identifier 410 may be registered with an entity or organization to which the responsibilities of assigning and/or administrating are delegated, such as the Internet Assigned Numbers Authority (IANA).

As described previously, there may be domains within domains. Accordingly, one of ordinary skill in the art will readily recognize that there may be domain identifiers identifying reservations at each "domain level." For example, a domain identifier identifies a reservation from inside a domain of reservation treatment while a sub-domain identifier identifies the reservation further as being from inside a sub-domain within that domain.

Figure 4B:
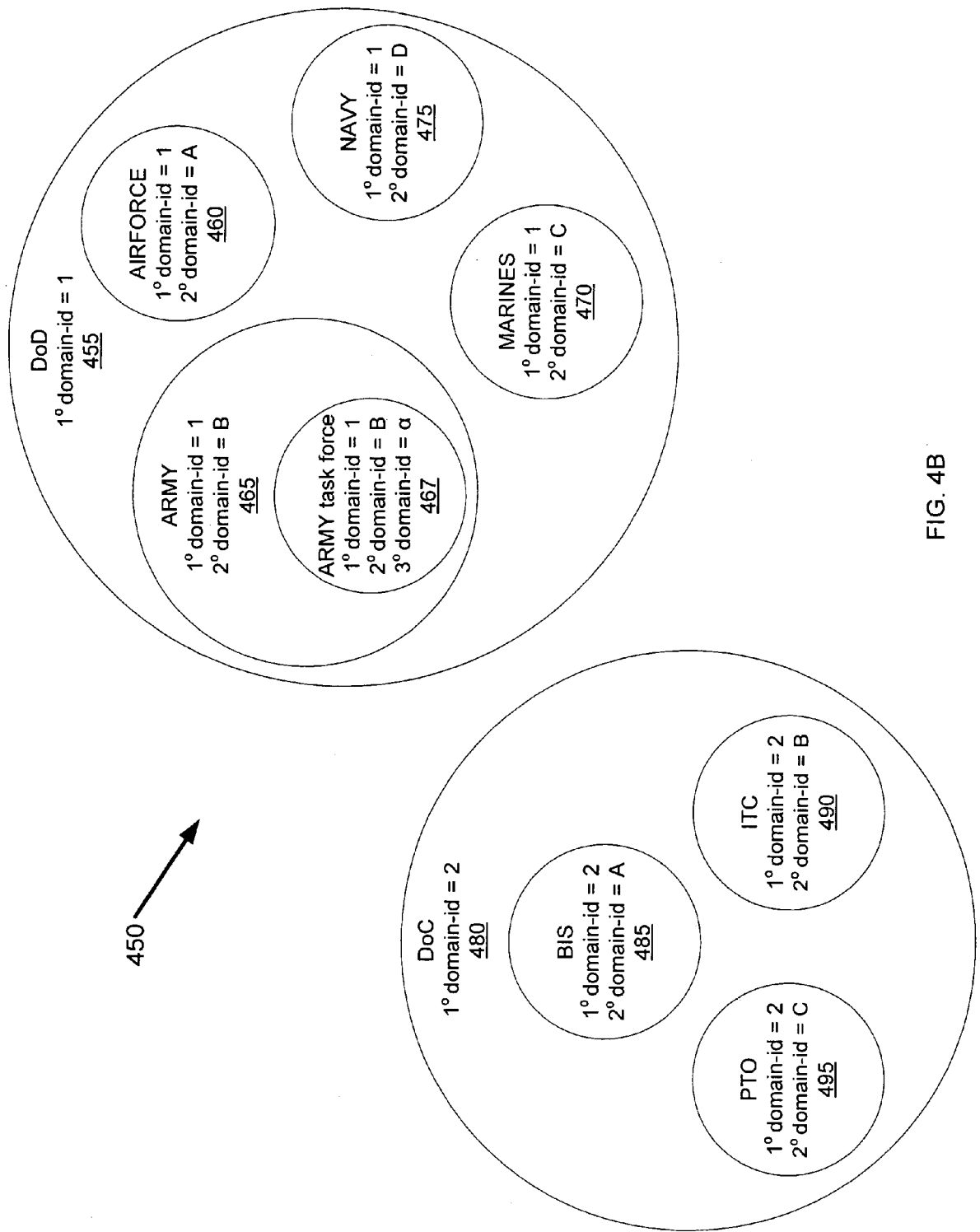

FIG. 4B illustrates the principle of treating a reservation according to a domain of reservation treatment (illustrated in FIGS. 2, and 3A-B) together with the principle of defining a domain of reservation treatment within a network (illustrated in FIG. 4A).

In FIG. 4B, an example network 450 includes a primary domain for the Department of Defense (DOD) 455 with a primary domain identifier of one. The example network 450 also includes a primary domain for the Department of Commerce (DOC) 480 with a primary domain identifier of two.

The DOD primary domain 455 includes secondary domains for the Air Force 460, the Army 465, the Marines 470, and the Navy 475 with secondary domain identifiers A, B, C, and D, respectively.

The DOC primary domain 480 includes secondary domains for the Bureau of Industry and Security (BIS) 485, the International Trade Commission (ITC) 490, and the Patent and Trademark Office (PTO) 495 with secondary domain identifiers A, B, and C, respectively.

As described above in reference to FIGS. 2 and 3A-B, a reservation is treated according to a domain of reservation treatment, and in particular the reservation is given a same meaning as other reservations in the domain in an event the reservation originates from inside the domain. As such, a reservation from inside the Air Force secondary domain 460 preempts other reservations inside the Air Force secondary domain 460 if the reservation preempts the other reservations, e.g., a priority value of the reservation preempts priority values of the other reservations.

Using priority value merely to illustrate a point, because reservations inside a domain of reservation treatment are given a same meaning, it is meaningful and appropriate to compare a first priority value of a first reservation to a second priority value of a second reservation and to determine, relative to the second priority value, whether the first priority value preempts the second priority value. Put simply things (reservations) are organized (domain of reservation treatment) so that like things (reservations within the domain of reservation treatment) are treated alike (given a same meaning) and compared alike (reservation relative to other reservations).

In contrast to the prior example, a reservation from inside the Air Force secondary domain 460 cannot preempt other reservations inside the BIS secondary domain 485. Even though the reservation originates from inside the network 450 (as contrasted with a reservation from outside the network 450) the reservation from inside the Air Force secondary domain 460 cannot preempt reservations inside the BIS secondary domain 485. The reservation is not from inside the DOC primary domain 480, and thus, is given a different meaning.

Again, using priority value merely to illustrate a point, because a reservation originates from outside a domain of reservation treatment is given a same meaning, it is not meaningful and inappropriate to compare a first priority value of a first reservation to a second priority value of a second reservation and to determine, relative to the second priority value, whether the first priority value preempts the second priority value. A priority value which preempts priority values of other reservations from one domain does not necessarily preempt priority values of reservations from another domain. The above prevents one organization from controlling or otherwise dictating how network layer resources are reserved in another organization.

Continuing with FIG. 4B, a reservation from inside the Air Force secondary domain 460 cannot preempt other reservations inside the Navy secondary domain 475 even though the reservation originates from inside the DOD primary domain 455. In contrast with the prior example of differing primary domains, in this example the primary domain is the same, but the reservation originates from a different secondary domain.

This example highlights several aspects of the present invention, one being a domain of reservation treatment may be "divided" into one or more sub-domains, which in turn may be further divided. Another aspect, perhaps more significant, an organization can "create" additional domains of reservation treatment on a dynamic basis and without regard to other organizations or other domains within the organization.

Consider for example a conflict in a country Alpha requiring the Army to deploy a task force to country Alpha. In deploying the task force to country Alpha, the Army creates within the Army secondary domain 465, a ternary domain 467 for the task force. In this way reservations from inside the Army secondary domain 465 do not preempt reservations inside the task force ternary domain 467. Given the critical and urgent nature of the deployment to country Alpha, preventing reservations from outside the task force ternary domain 467 from preempting and re-allocating network layer resources may be of great significance.

Furthermore, treating reservations according to the task force ternary domain 467 does not effect how reservations are treated in the Army secondary domain 465. For example, a reservation which preempts other reservations inside the task force ternary domain 467 does not necessarily preempt reservations inside the Army secondary domain 465, and vice versa. As a benefit of treating a reservation according to a domain of reservation treatment, changes in an organization, such as creating a group within the organization, do not require "re-prioritizing" reservations. For example, reservations of high priority from the organization will not be preempted by reservations from the group regardless of priority.

The aforementioned description introduces the notion of a priority value and a domain identifier, values or pieces of information which may be useful in treating reservations for network layer resources according to domain of reservation treatments and defining domain of reservation treatments within a network. Such values may be realized or otherwise brought about, by creating, for example, within a reservation for network layer resources, a new priority value and a new domain identifier value. In this example, a portion of the reservation is set aside (e.g., one to two bytes) creating a field for the priority value and a field for the domain identifier value. Additional portions of the reservation may be set aside for additional domain identifiers, such as a sub-domain or "secondary" domain identifier.

In another example, one or more existing values within a reservation are used for a priority value and a domain identifier value. For example, an existing (32)-bit value is subdivided into an 8-bit priority value, a (12)-bit domain identifier value, and a (12)-bit sub-domain identifier value.

One of ordinary skill in the art will readily recognize that the aforementioned bit and byte lengths are merely for illustrative purposes and are not intended to limit embodiments of the present invention. The length of the values and the number of the values depend, for example, on the number of reservations, domains, sub-domains, etc. which need to be identified. Furthermore, assignment and/or administration of one or more of these values may be delegated to one entity or organization (e.g., IANA) or left to each individual organization to self-administrate.

For example, domain identifiers are assigned and administrated by IANA (or another similar administrative body) to prevent a domain identifier from being registered to and used by more than one organization within a network, such as the Internet. In this way a first reservation belonging to a first domain of reservation treatment is prevent from colliding or otherwise interfering with a second reservation belonging to a second domain of reservation treatment. Sub-domain identifiers, on the other hand are self-administered by an organization to create, for example, a hierarchy within the organization. In this way, collisions between organizations are avoided, while providing flexibility and autonomy within an organization.

Furthermore, one of ordinary skill in the art will readily recognize that embodiments of the present invention are not excluded from changing these values at, for example, border elements, ensuring no collisions of domain values (and sub-domain values), and preserving the functionality desired.

Figure 5A:
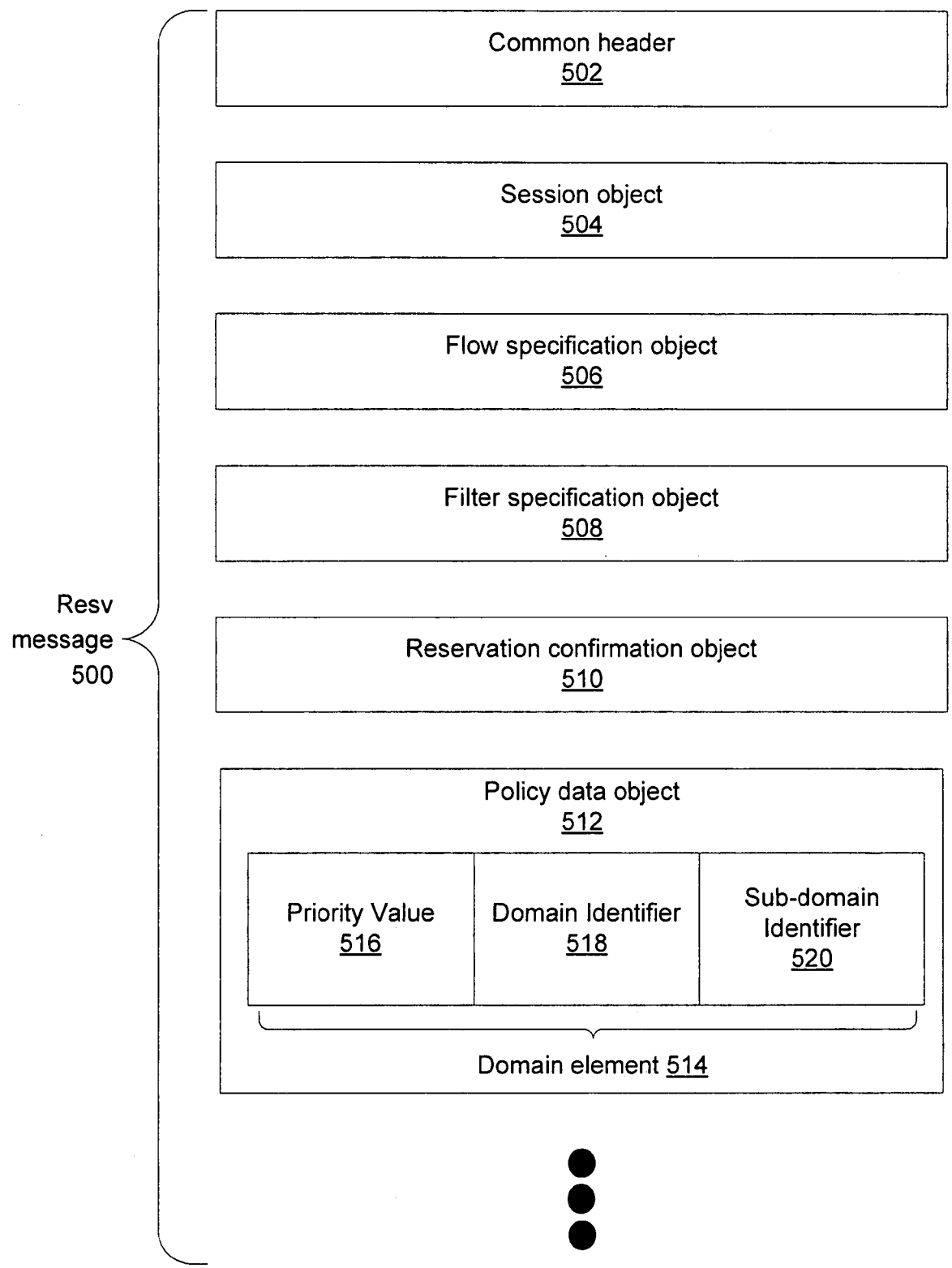
FIGS. 5A-5B are message block diagrams of example Resource ReSerVation Protocol (RSVP) reservation (Resv) messages.
Figure 5B:
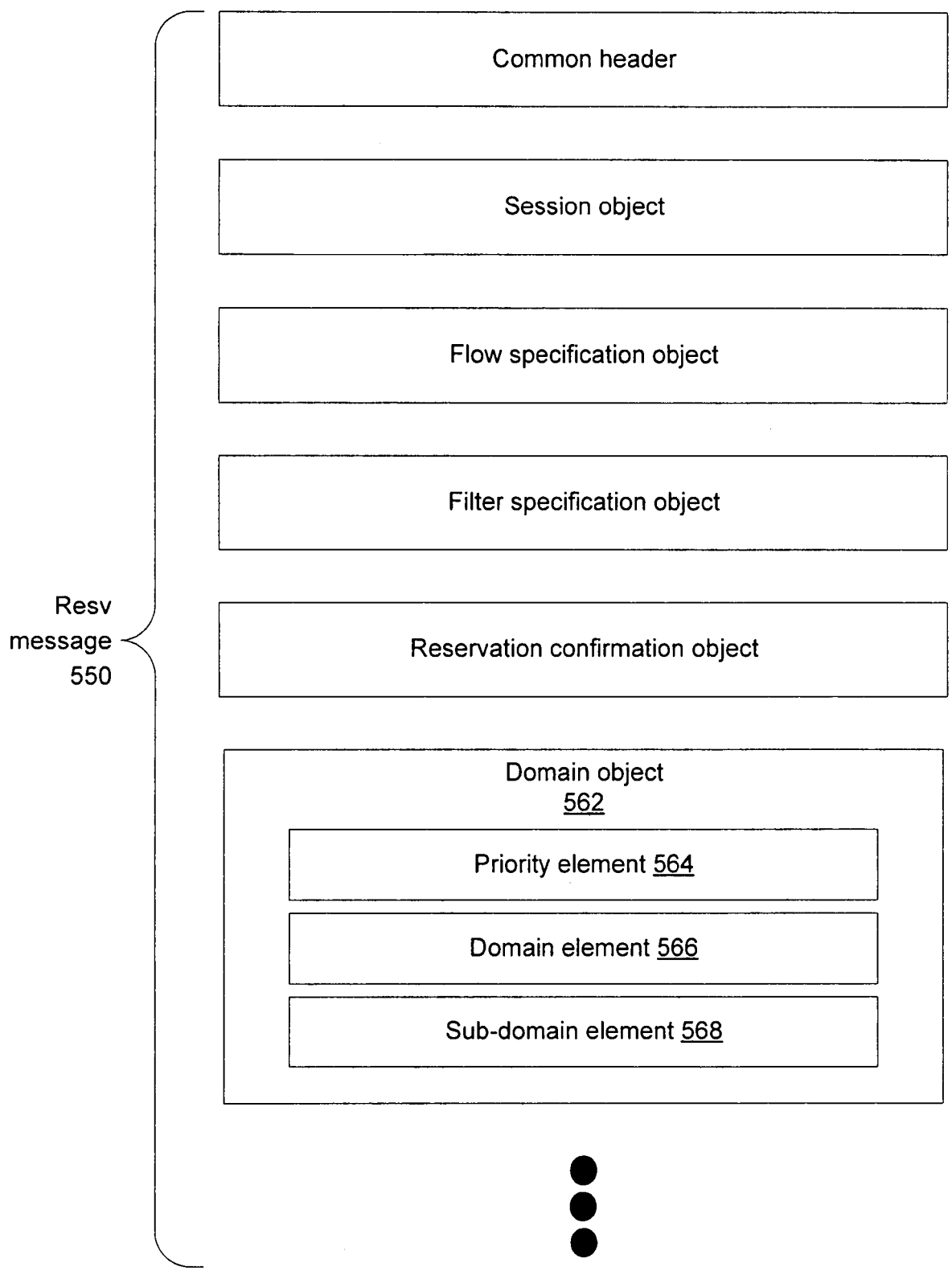

FIGS. 5A-B, illustrate implementing principles of the present invention (namely, treating a reservation for network layer resources according to a domain of reservation treatment within a network and defining the domain) within a mechanism for reserving network layer resources, such as the Resource ReSerVation Protocol (RSVP). RSVP is defined in R. Braden, et al., "Resource ReSerVation Protocol (RSVP)," Request For Comments (RFC) 2205. One of ordinary skill in the art will readily recognize the principles of the present invention are also applicable to other reservation mechanisms, such as the Next Step in Signaling (NSIS) protocol. NSIS is defined in R. Hancock, et al., "Next Steps in Signaling (NSIS): Framework", RFC 4080.

For the sake of convenience and for purposes of further describing embodiments of the present invention, the following describes aspects of the present invention as it relates specifically to RSVP. However, before describing implementing principles of present invention with RSVP, an overview of reservation protocol is provided below.

The Resource ReSerVation Protocol (RSVP) protocol is a network layer control (signaling) protocol which enables applications to reserve network layer resources for data flows in order to obtain a certain QoS (e.g., constant data rate) for the data flows. RSVP is contrasted with the Session Initiation Protocol (SIP) which is an application-layer control (signaling) protocol for creating, modifying, and terminating sessions with one or more participants.

RSVP works in conjunction with routing protocols, such as Routing Information Protocol (RIP) and Open Shortest Path First (OSPF) to reserve network layer resources for data flows in a data network in order to establish a level of QoS required by the data flows. RSVP is not a routing protocol, and as such, is designed to manage flows of data rather than to make decisions for each individual datagram.

Pursuant to RSVP, a data flow is a sequence of messages (datagrams) that have the same source address and same destination address (unicast or multicast). Data flows are unidirectional in that data travels on a data flow from a sender to a receiver. A session is a collection of one or more data flows that have the same unicast or multicast destination address. Sessions typically utilize port and protocol numbers much like data flows. Sessions differ from data flows in that a session may have multiple senders, whereas a data flow only originates from a single sender.

In a protocol, such as RSVP, signaling messages are used to reserve resources for data flows. RSVP defines two fundamental types of signaling messages, a RSVP path (Path) message and a RSVP reservation request (Resv) message. Path messages are typically sent by senders to identify them and indicate the resources (e.g., bandwidth) needed to receive their programming or content. These messages proceed hop-by-hop on a path through the communication network to one or more receivers. The Path messages make intermediate nodes on the path aware of the possibility that a reservation of resources may be required. If a receiver is interested in the programming or content offered by a particular sender, it responds with an RSVP Resv message to reserve resources for a data flow between the sender and receiver. The Resv message specifies resources needed to accommodate the data flow. The Resv message travels hop-by-hop on the same path taken by the Path message but in the reverse direction back to the sender. At each hop, the corresponding intermediate node establishes a reservation for the receiver by setting aside (reserving) resources specified in the Resv message for the data flow. These resources are immediately made available to the data flow. If resources are not available, the reservation may be refused explicitly so that the receiver knows it cannot depend on the corresponding resources being devoted to its traffic. By using RSVP, packets carrying, e.g., time-sensitive information can be accorded the resources and services they need to ensure timely delivery.

The RSVP protocol includes error and confirmation messages that are used to provide information about the status of a reservation. These messages include a path-error message, a reservation-request error message and a reservation-request-confirmation message. A path-error message results from a Path message. The path-error message travels towards the sender that issued the Path message. A reservation-request-error message results from a Resv message. The reservation-request-error message travels towards the receiver that issued the Resv message. The path-error and reservation-request-error messages include information associated with errors due to processing Path and Resv messages, respectively, such as admission failure, bandwidth unavailable, service not supported, bad flow specification, ambiguous path and the like.

A reservation-request-confirmation (ResvConf) message confirms a reservation associated with a Resv message issued by the receiver. The ResvConf message is generated by a sender in response to receiving a Resv message that contains a reservation confirmation object. A copy of the reservation object is included in the ResvConf message to inform the receiver of the specific reservation being confirmed by the ResvConf message. The generated ResvConf is forwarded by the sender to the receiver that issued the Resv message.

Having provided a background to RSVP, the particulars of implementing principles of the present invention within RSVP are now addressed. The present invention may use both RSVP Path and Resv messages to treat a reservation for network layer resources according to a domain of reservation treatment. Furthermore, the present invention may also use both RSVP Path and Resv messages to define a domain of reservation treatment within a network.

The following describes practicing embodiments of the present invention using an example RSVP Resv message. However, one skilled in the art will readily recognize the following description is equally pertinent and applicable to using a RSVP Path message. Accordingly, the present description focuses primarily on the example RSVP Resv message.

In accordance with RSVP, a receiver establishes a new reservation for resources for a data flow between a sender and a receiver by responding to a sender's Path message with a reservation request (Resv) message. The Resv message travels upstream hop-by-hop along the path used by the Path message from the receiver to the sender. The Resv message contains information that is used by intermediate nodes along the path to reserve resources for the data flow.

FIG. 5A illustrates an example Resv message 500 which may be used with the present invention. The Resv message 500 is illustratively of a RSVP Resv message comprising a common header 502, a session object 504, a flow specification (flowspec) object 506, a filter specification (filter spec) object 508, a reservation confirmation object 510, and a policy data object 512.

It should be noted that the Resv message 500 may contain other objects, such as an Integrity object. However, the policy data object 512 is most germane to the discussion at hand and will now be discussed in further detail.

A policy data object which may be used with the present invention is defined in S. Herzog, "RSVP Extensions for Policy Control" RFC 2750, hereinafter referred to as the "RFC 2750 policy data object." The RFC 2750 policy data object includes, among other things, a list of one or more policy elements.

One such policy element is a preemption priority policy element defined in S. Herzog, "Signaled Preemption Priority Policy Element," RFC 3181, hereinafter referred to as the "RFC 3181 preemption priority policy element." The RFC 3181 preemption priority policy element contains, among other things, a preemption priority field and a defending priority field. The preemption priority field holds a value that identifies a priority of a new reservation and the defending priority field holds a value that identifies a defending priority that is used to "defend" against being preempted by newer reservations after the reservation has been admitted into a network. In this way, the RFC 3181 preemption priority policy element represents a relative importance of the reservation with respect to a set of admitted (existing) reservations in a network.

It is important to note that the RFC 3181 preemption priority policy element merely represents a relative importance of a reservation with respect to existing reservations in a network. In stark contrast, the present invention treats a reservation according to a domain of reservation treatment within a network, and not according to the network itself. In fact, in one convenient embodiment, a reservation is compared to other reservations in a domain of reservation treatment to determine whether the reservation, relative to the other reservations in the domain (not a network), preempts the other reservations. In this way, the RFC 3181 preemption priority policy element as it is described in RFC 3181 is not the same as the present invention.

However, the present invention may use, in some embodiments, the RFC 3181 preemption priority policy element in a manner neither taught nor made obvious by RFC 3181.

Returning to FIG. 5A, in one embodiment, a domain element 514 is a pre-existing value of the Resv message 500, such as the RFC 3181 preemption priority policy element. However, unlike RFC 3181 which is limited to preempting reservations in a network and thus only requiring a priority value, the domain element 514 includes a priority value 516, a domain identifier 518, and, in this example, a sub-domain identifier 520.

As described above in reference to FIGS. 4A-B, the domain identifier 518 (and the sub-domain identifier 520) defines a domain of reservation treatment within a network in which to treat a reservation for network layer resources. As such, with the domain element 514, a first reservation from a first domain can be treated differently (i.e., given a different meaning) than a second reservation from a second domain, even though both reservations are from a same network. Again, because RFC 3181 is limited to preempting reservations in a network, the RFC 3181 preemption priority policy element cannot be used as described by RFC 3181 to treat reservations from a same network differently.

In an alternative embodiment illustrated in FIG. 5B, an example Resv message 550 includes a domain object 562. The domain object 562 includes a priority element 564, a domain element 566, and in this example, a sub-domain element 568. Unlike the domain element 514 of FIG. 5A, the domain object 562 is not a pre-existing value, but is a new object defining new elements, namely, the priority element 564, the domain element 566, and in this example, the sub-domain element 568. Unlike the previous embodiment which may require modifying RFC 3181 and/or other networking standards, this embodiment leaves existing network standards untouched.

Returning to FIG. 5A, for the sake of completeness the common header 502, the session object 504, the flowspec object 506, the filter spec object 508, and the reservation confirmation object 510 are now described in greater detail.

The common header 502 contains information about the message 500 including a version field, a flags field, a message type field, a checksum field, a send "time-to-live" (TTL) field and a length field. The version field holds a value that identifies a version of RSVP associated with the message 500. The flags field holds flags associated with the message 500. The message type field holds an identifier (ID) that identifies the message 500 as an RSVP Resv message. The checksum field holds a value that represents a checksum associated with the message 500. The send TTL field holds a value that represents a "time-to-live" value for the message 500 and the length field holds a value that represents a length of the message 500, illustratively in bytes.

The session object 504 defines a session specification for the data flow for which resources are being reserved. The session object 504 contains an object header having length, class and type fields, a receiver address field, a protocol ID field, a flags field and a receiver port field. The object header contains information similar to the object headers described above except that the class field holds a value that identifies the session object 504 as belonging to the RSVP SESSION class and the type field holds a value that indicates a type of the object (e.g., IPv4 session object, IPv6 session object) within the class. The receiver address and receiver port fields hold an address (e.g., IP address) and a port (e.g., IP port), respectively, that are associated with the data flow's receiver. The protocol ID field holds an identifier that identifies a protocol associated with the data flow and the flags field holds various flags associated with the data flow.

The flowspec object 506 contains information that defines various traffic characteristics associated with the new reservation. Specifically, the flowspec object 506 contains an object header, comprising length, class and type fields, and various traffic parameters. The object header holds information similar to the object headers described above except that the class field holds a value that indicates the object 506 belongs to the RSVP FLOW_SPEC class and the type field holds a value that indicates a type of object within the class. The traffic parameters may include parameters defined in various "int-serv" working group documents, such as parameters described in S. Shenker, et al., "General Characterization Parameters for Integrated Service Elements," RFC 2215.

The filter spec object 508 contains information related to the sender. The filter spec object 508 contains an object header, a sender address field and a sender port field. The object header holds information similar to the object headers described above except that the class field holds a value that indicates the object belongs to the RSVP FILTER_SPEC class and the type field holds a value that indicates a type of address (e.g., IPv4 address, IPv6 address) in the sender address and port fields. The sender address and sender port fields hold an address and port, respectively, of the data flow's sender.

The reservation confirmation object 510 contains information related to the receiver that issued the Resv message 500. The reservation confirmation object 510 contains an object header and a receiver address field. The object header holds information similar to the object headers described above except that the class field holds a value that indicates the object belongs to the RSVP RESV_CONFIRM class and the type field holds a value that indicates a type of address (e.g., IPv4 address, IPv6 address) in the receiver address field. The receiver address field holds an address of the receiver that issued the Resv message 500.

Figure 6A:
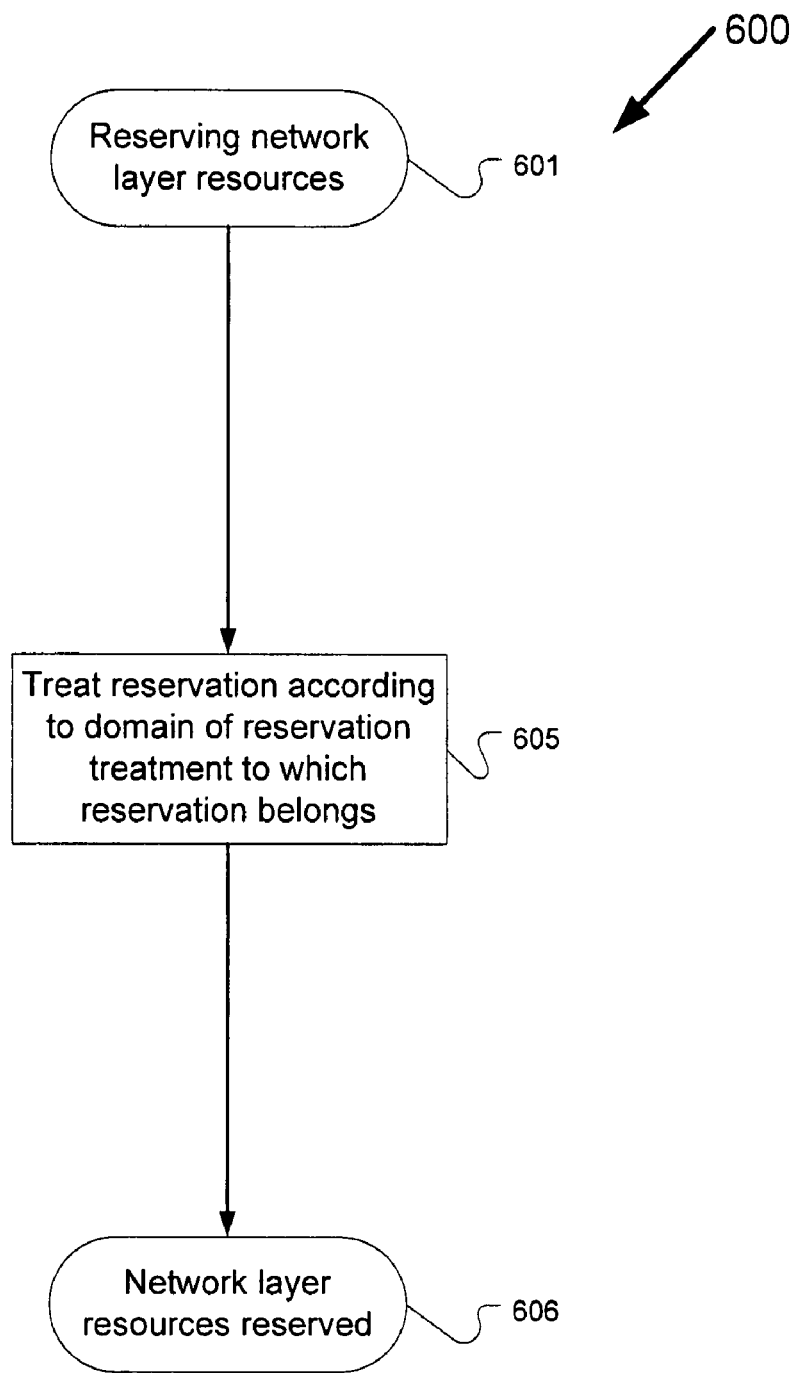
FIG. 6A-6C are flow diagrams of example processes for reserving network layer resources.

FIG. 6A illustrates an example process 600 for reserving network layer resources. The process 600 starts (601) reserving network layer resources. The process 600 treats (605) a reservation for network layer resources according to a domain of reservation treatment to which the reservation belongs. The process 600 ends (606) with the network layer resources reserved.

Figure 6B:
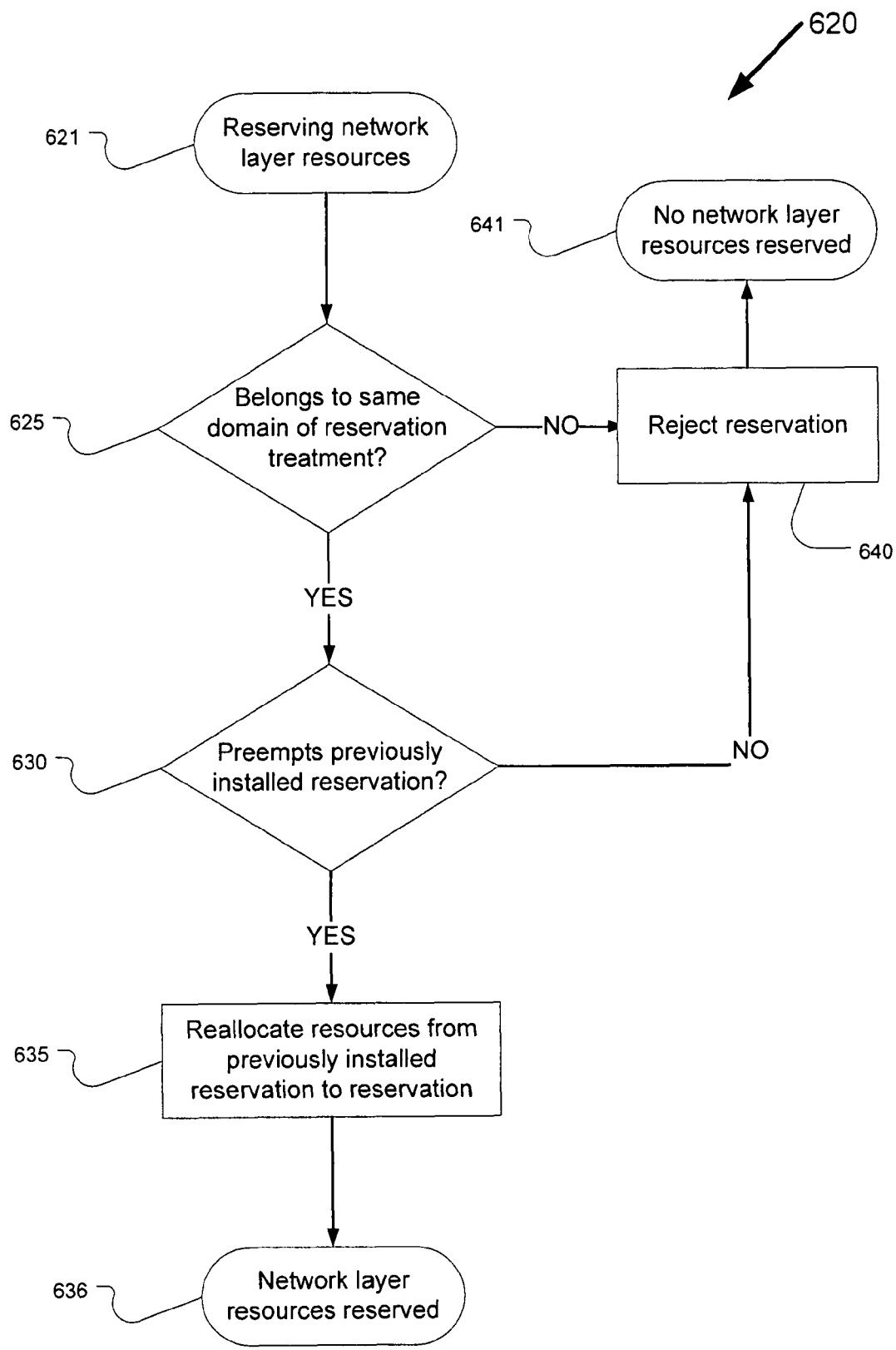

FIG. 6B illustrates another example process 620 for reserving network layer resources. In this example and for illustration purposes, all network layer resources are reserved by previously installed reservations. That is, a capacity of a network is reached and there are no more network layer resources available. Installing or otherwise reserving network layer resources per a reservation requires reallocating network layer resources from one or more previously installed reservations.

The process 620 starts (621) reserving network layer resources. The process 620 determines (625) whether a reservation for network layer resources and an at least one previously installed reservation belong to a same domain of reservation treatment. In an event the process 620 determines (625) the reservation belongs to the same domain of reservation treatment of the at least one previously installed reservation, the process 620 determines (630) whether the reservation, relative to the at least one previously installed reservation, preempts the at least one previously installed reservation.

In an event the process 620 determines (630) that relative to the at least one previously installed reservation, the reservation preempts the at least one previously installed reservation, the process 620 reallocates (635) network layer resources from the at least one previously installed reservation to the reservation. The process 620 ends (636) with the network layer resources reserved.

However, in an event the process 620 determines (625) the reservation is does not belong to a same domain of reservation treatment of the at least one previously installed reservation, the process 620 rejects (640) the reservation and ends (641) with no network layer resources reserved.

Additionally, in an event the process 620 determines (630), relative to the at least one previously installed reservation, the reservation does not preempt the at least one previously installed reservation, the process 620 rejects (640) the reservation and ends (641) with no network layer resources reserved.

Figure 6C:
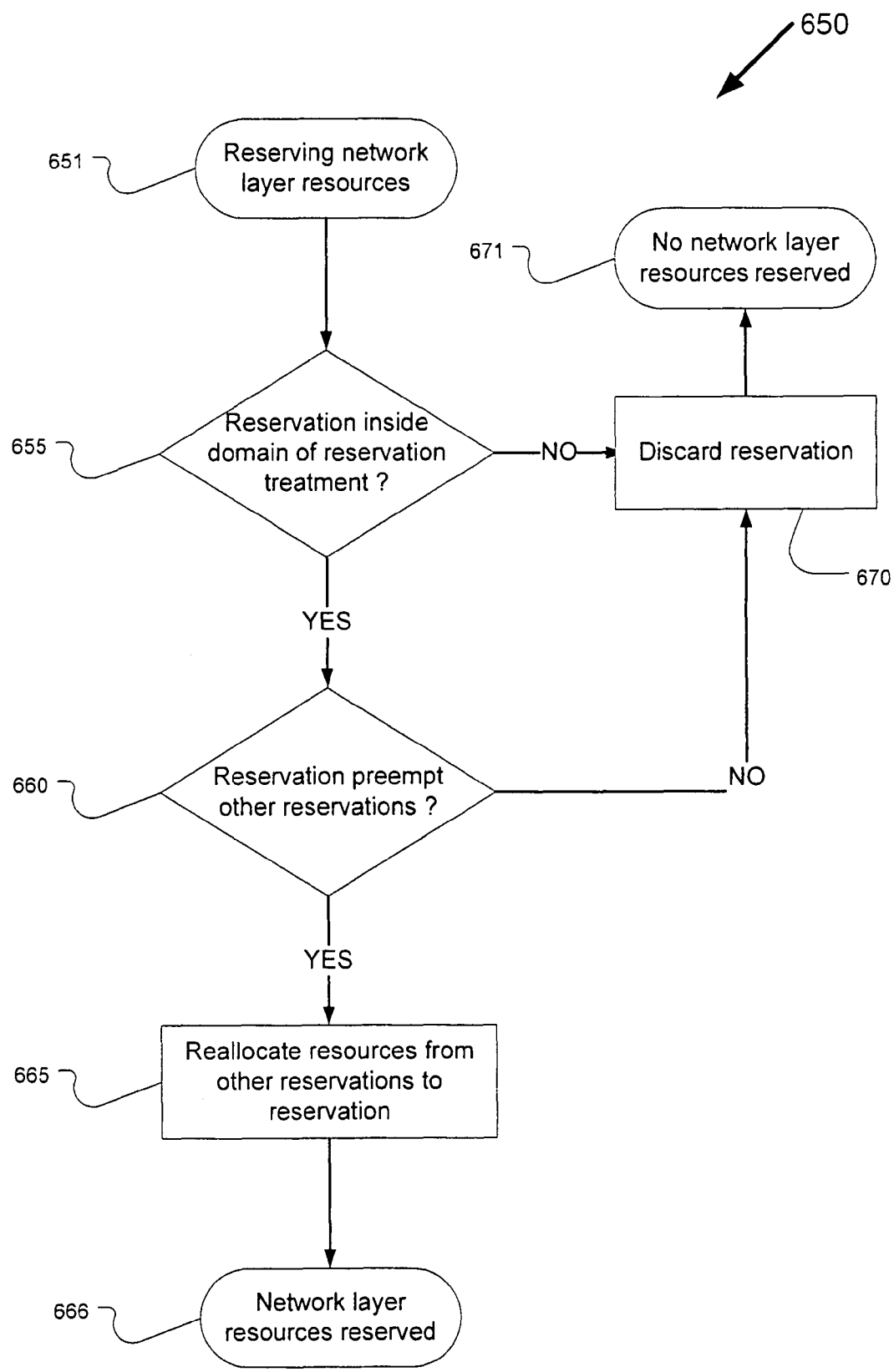

FIG. 6C illustrates yet another example process 650 for reserving network layer resources. The process 650 starts (651) reserving network layer resources. The process 650 determines (655) whether a reservation for network layer resources originates from inside a domain of reservation treatment. In an event the process 650 determines (655) the reservation originates from inside the domain of reservation treatment, the process 650 determines (660) whether the reservation, relative to other reservations in the domain, preempts the other reservations.

In an event the process 650 determines (660) that relative to the other reservations, the reservation preempts the other reservations, the process 650 reallocates (665) network layer resources from the other reservations to the reservation. The process 650 ends (666) with the network layer resources reserved.

However, in an event the process 650 determines (655) the reservation is not from inside the domain reservation treatment (i.e., the reservation originates from outside the domain), the process 650 discards (670) the reservation and ends (671) with no network layer resources reserved.

Additionally, in an event the process 650 determines (660), relative to the other reservations, the reservation does not preempt the other reservations, the process 650 the process 650 discards (670) the reservation and ends (671) with no network layer resources reserved.

One of ordinary skill in the art will readily recognize that the process 650 may include alternative and/or additional blocks. For example, the process 650 determines whether a reservation, relative to other reservations, is preferred over the other reservations. In an event the reservation is preferred over the other reservations; the process 650 allocates network layer resources to the reservation over the other reservations.

In another example, in an event the process 650 determines (655) the reservation originates from outside the domain of reservation treatment, the process 650 ignores the reservation and reserves network layer resources according to a default reservation.

In yet another example, the process 650 determines whether a reservation for network layer resources can be installed or otherwise made. For example, the process 650 determines whether an end-node requesting a reservation has the authority to make such a reservation. In another example, the process 650 determines whether an end node or intermediate node has sufficient network layer resources available for a reservation.

Figure 7A:
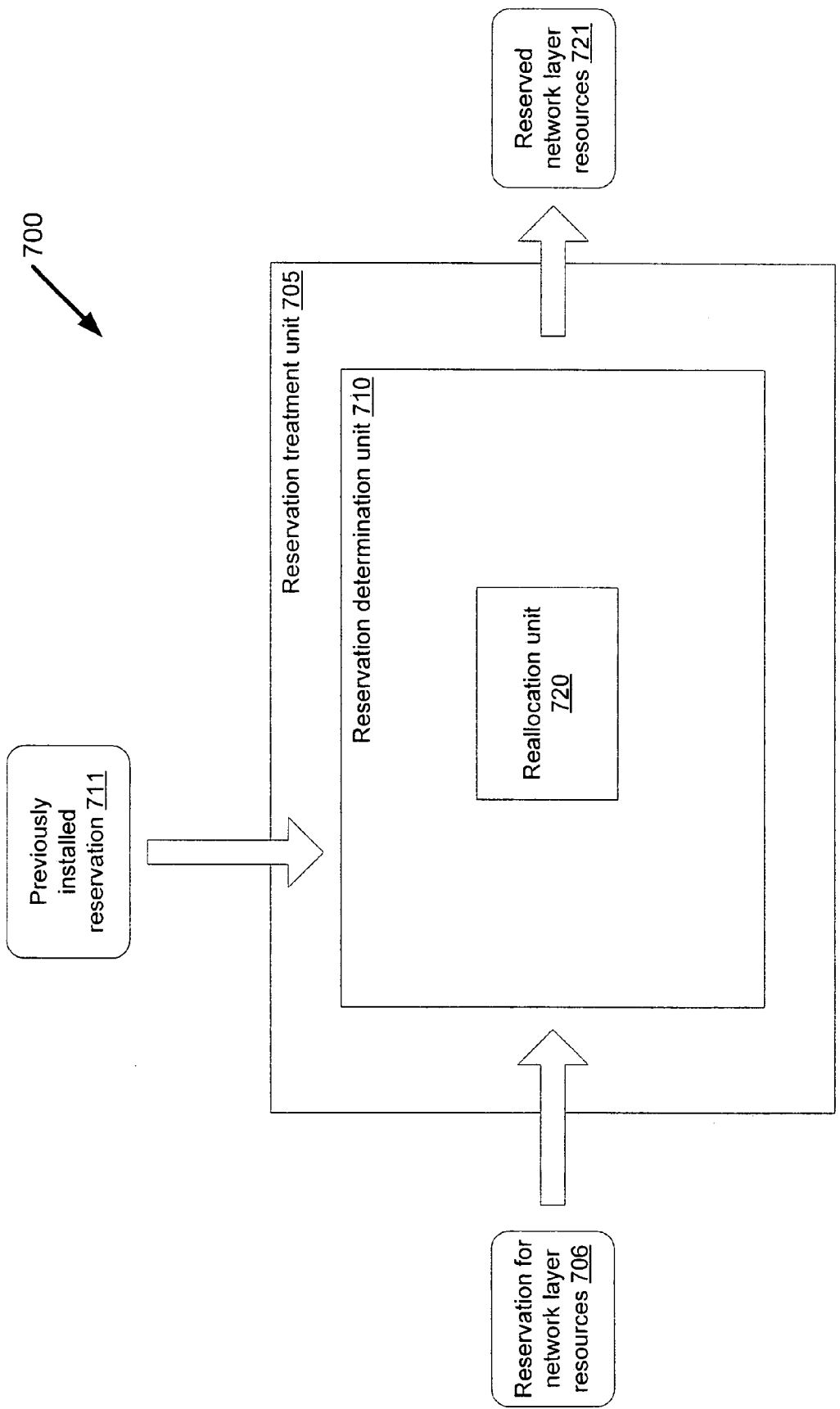
FIGS. 7A and 7B are a block diagrams of example systems to reserve network layer resources.

In FIG. 7A, an example system 700 to reserve network layer resources includes a reservation treatment unit 705 to treat a reservation 706 for network layer resources according to a domain of reservation treatment to which the reservation 706 belongs. The reservation treatment unit 705 includes a reservation determination unit 710 to determine whether the reservation and an at least one previously installed reservation 711 belong to the same domain of reservation treatment and to determine whether the reservation 706, relative to the at least one previously installed reservation 711, preempts the at least one previously installed reservation 711.

In an event, the reservation determination unit 710 determines that the reservation 706 belongs to the same domain of reservation treatment as the previously installed reservation 711 and determines that the reservation 706, relative to the at least one previously installed reservation 711, preempts the at least one previously installed reservation 711, network layer resources are reallocated to the reservation 706, resulting in reserved network layer resources 721.

However, in an event the reservation 706 does not belong to a same domain of reservation treatment as the at least one previously installed reservation 711, the reservation 706 is discarded or otherwise rejected and no network layer resources are reserved.

Figure 7B:
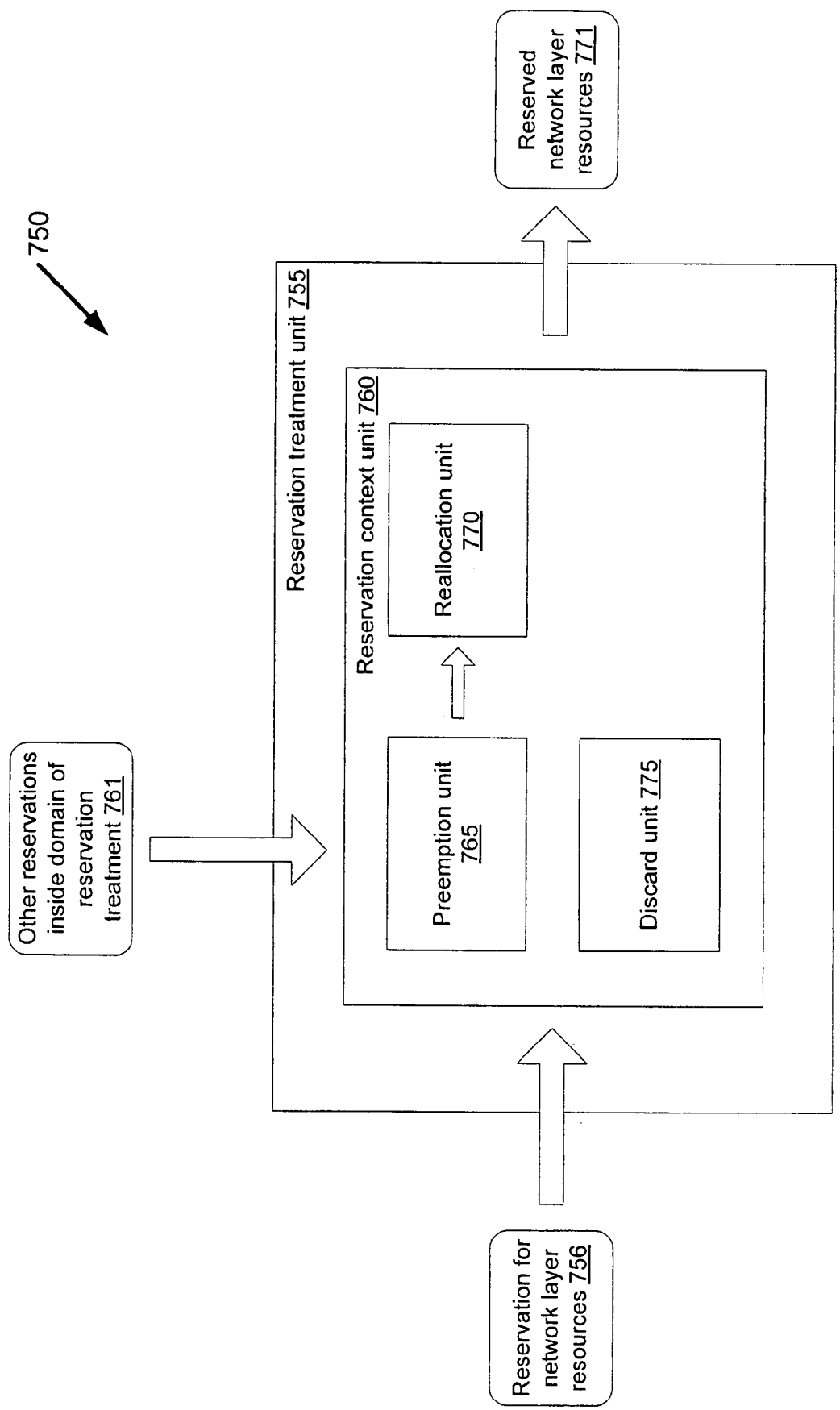

In FIG. 7B, an example system 750 to reserve network layer resources includes a reservation treatment unit 755 to treat a reservation 756 for network layer resources according to a domain of reservation treatment to which the reservation 756 belongs. The reservation treatment unit 755 includes a reservation context unit 760 to give a same meaning to the reservation 756 as other reservations 761 in the domain in an event the reservation 756 originates from inside the domain. However, in an event the reservation 756 originates from outside the domain, the reservation context unit 760 gives a different meaning to the reservation 756 as the other reservations 761 in the domain.

In an event the reservation 756 originates from inside the domain, a preemption unit 765 compares the reservation 756 to the other reservations 761 to determine whether the reservation 756, relative to the other reservations 761, preempts the other reservations 761. In an event of the reservation 756 preempts, a reallocation unit 770 reallocates network layer resources to the reservation 756 from the other reservations 761, resulting in reserved network layer resources 771.

The reservation context unit 760 also includes a discard unit 775 to discard the reservation 756 in an event the reservation 756 originates from outside the domain of reservation treatment. Alternatively, the discard unit 775 ignores the reservation 756 and reserves network layer resources according to a default reservation. As such, network layer resources may still be reserved (albeit not per the reservation 756) even when a reservation originates from outside a domain of reservation treatment.

One of ordinary skill in the art will readily recognize that the example system 750 may include alternative and/or additional blocks. For example, the reservation context unit 760 may further include a preference unit to compare a reservation to other reservations to determine whether the reservation, relative to other the reservations, is preferred over the other reservations. Additionally the reservation context unit 760 may include an allocation unit to allocate network layer resources to the reservation from other reservations in an event the reservation is preferred over the other reservations. Alternatively, the preference unit and allocation unit may be included as an additional and separate reservation context unit similar to the reservation context unit 760.

In yet another example, the example system 750 may include a policy decision point to manage treatment of the reservation 756 for network layer resources. In a convenient embodiment, the policy decision point is a Common Open Policy Service (COPS) server (described below).

So far, the aforementioned describes a technique for reserving network layer resources, namely, treating a reservation for network layer resources according to a domain of reservation treatment in network. In a particular embodiment, the technique is illustrated using the reservation mechanism of RVSP, a network layer control/signaling protocol for reserving network layer resources.

A convenient embodiment further includes managing reservation treatment to communicate a policy of treating reservations for network layer resources according to a domain of reservation treatment to at least one node with the domain. In one embodiment, treatment of a reservation is managed using the Common Open Policy Service (COPS) protocol defined in D. Durham et al., "The COPS (Common Open Policy Service) Protocol," RFC 2748. COPS is a network layer management protocol for communicating network layer traffic policy information to network devices. RSVP in contrast is a network layer control/signaling protocol for reserving network layer resources. As such, COPS and RSVP may be used together as described in S. Herzog et al., "COPS usage for RSVP," RFC 2749.

Figure 8:
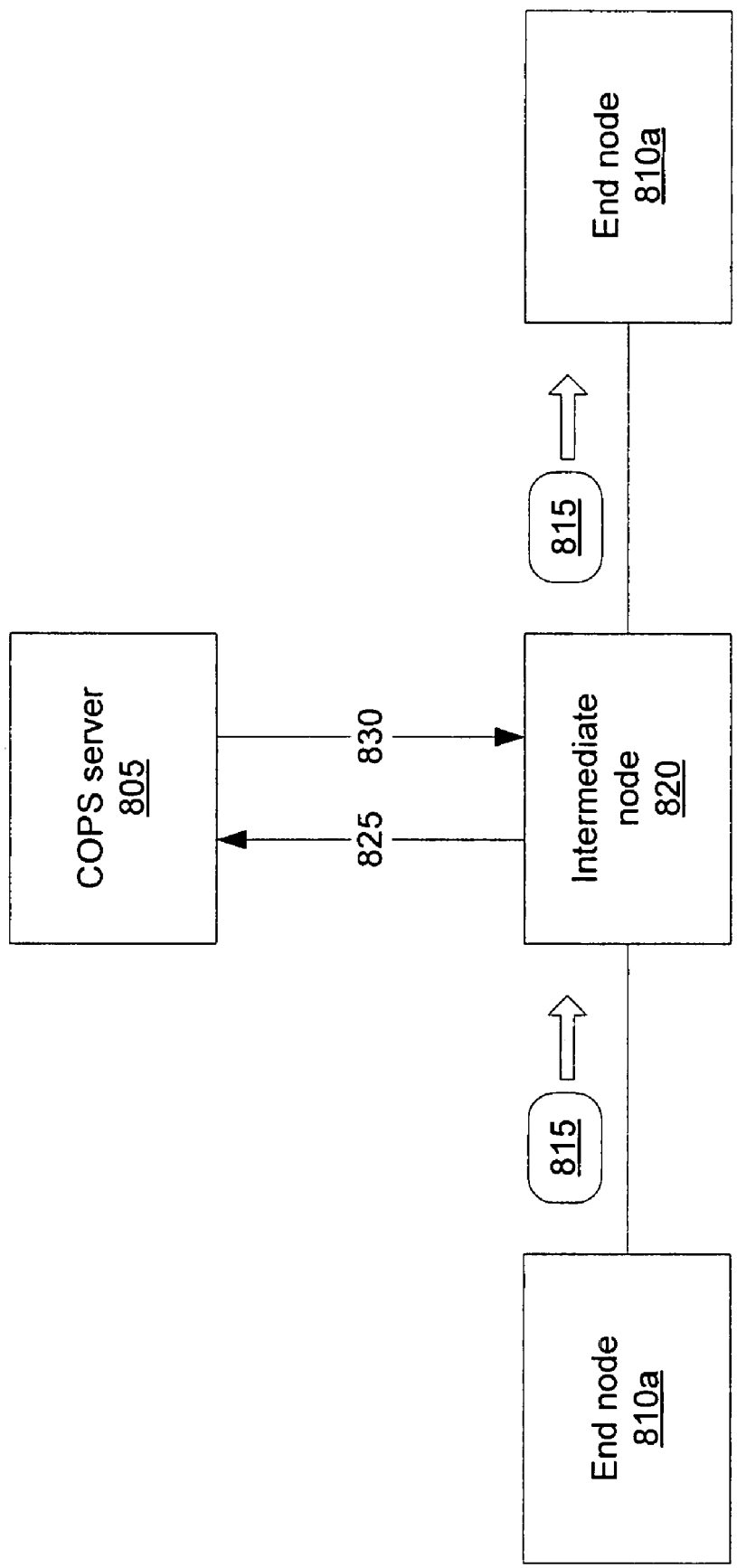
FIG. 8 is a block diagram of an example Common Open Policy Service (COPS) server to manage treatment of a reservation.

In FIG. 8, an example COPS server 805 manages treatment of a reservation 815 for network layer resources. Using the reservation 815 a first end node 810a requests that network layer resources at a second end node 810b be reserved. It may be said that the first end node 810a requests the second end node 810b to "install" the reservation 815. The reservation 815 passes through an intermediate node 820. In accordance with RSVP, the reservation 815 may also be installed at the intermediate node 820.

The intermediate node 820 is configured to request (825) and receive (830) policy decisions from the COPS server 805 regarding the reservation 815. In deciding whether the reservation 815 may be installed, the COPS server 805 consults a priority policy defined by, for example, priority, domain, and sub-domain elements (e.g., the priority element 564, the domain element 566, and the sub-domain element 568 of FIG. 5B). For example, the COPS server 805 determines whether the reservation 815 matches the priority policy with respect to priority, domain, and sub-domain elements.

Because the COPS server 805 communicates the priority policy to the intermediate node 820 so that the intermediate node 820 treats the reservation 815 accordingly, it may be said that a COPS server "pushes" a priority policy to network nodes. In this way some embodiments provide centralized monitoring and control of treating reservations for network layer resources according to a domain of reservation treatment within a network.

While this invention has been particularly shown and described with references to example embodiments thereof, it will be understood by those skilled in the art that various changes in form and details may be made therein without departing from the scope of the invention encompassed by the appended claims.

It should be understood that the block and flow diagrams (e.g., FIGS. 6A-B, FIG. 7 and FIG. 8) may include more or fewer elements, be arranged differently, or be represented differently. It should be understood that implementation may dictate the block and flow and diagrams and the number of block and flow diagrams illustrating the execution of embodiments of the invention.

It should be further understood that elements of the block and flow diagrams (e.g., FIGS. 6A-B, FIG. 7 and FIG. 8) described above may be implemented in software, hardware, or firmware. In addition, the elements of the block and flow diagrams described above may be combined or divided in any manner in software, hardware, or firmware. If implemented in software, the software may be written in any language that can support the embodiments disclosed herein. The software may be stored on any form of computer readable medium, such as random access memory (RAM), read only memory (ROM), compact disk read only memory (CD-ROM), and so forth. In operation, a general purpose or application specific processor loads and executes the software in a manner well understood in the art.

What is claimed is:

1. A method comprising: treating a reservation for network layer resources by a network node processor according to a domain of reservation treatment to which the reservation belongs resulting in a treated reservation, the treated reservation is a request to reserve network layer resources;

wherein treating the reservation includes:

giving a same meaning to the reservation as other reservations in the domain in an event the reservation originates from inside the domain resulting in the treated reservation having a same meaning as the other reservations; and giving a different meaning to the reservation as other reservations in the domain in an event the reservation originates from outside the domain resulting in the treated reservation having a different meaning as the other reservations.

2. The method of claim 1 further comprising reallocating network layer resources to the treated reservation from an at least one previously installed reservation resulting in reallocated network layer resources in an event the treated reservation preempts the at least one previously installed reservation.

3. The method of claim 1 wherein giving the same meaning includes comparing the reservation to other reservations in the domain to determine whether the treated reservation, relative to the other reservations, preempts the other reservations.

4. The method of claim 3 further comprising reallocating network layer resources to the treated reservation from other reservations in the domain resulting in reallocated network layer resources in an event the treated reservation preempts the other reservations.

5. The method of claim 1 wherein giving the same meaning includes comparing the reservation to other reservations in the domain to determine whether the treated reservation, relative to the other reservations, is preferred over the other reservations.

6. The method of claim 5 further comprising allocating network layer resources to the treated reservation over the other reservations resulting in allocated network layer resources in the domain in an event the treated reservation is preferred over the other reservations.

7. The method of claim 1 wherein giving the different meaning includes either: ignoring the reservation and reserving network layer resources according to a default reservation resulting in default reserved network layer resources or discarding the reservation resulting in a discarded reservation.

8. The method of claim 1 further comprising defining within the network at least one domain of reservation treatment resulting in at least one domain of reservation treatment defined in the network.

9. The method of claim 8 wherein defining the at least one domain of reservation treatment includes registering a domain identifier to the at least one domain of reservation treatment resulting in a registered domain identifier, the registered domain identifier identifies the at least one domain of reservation treatment uniquely within the network and (ii) prevents reservations belonging to the at least one domain of reservation treatment from colliding with other reservations belonging to other domains of reservation treatment in the network.

10. The method of claim 1 further comprising managing reservation treatment resulting in a managed reservation treatment, the managed reservation treatment used to communicate a policy of treating the reservation according to the domain of reservation treatment to at least one node within the domain.

11. A system comprising: a network interface to receive a reservation for network layer resources;

a reservation treatment unit communicatively coupled to the network interface to treat the received reservation for network layer resources according to a domain of reservation treatment to which the reservation belongs resulting in a treated reservation, the treated reservation is a request to reserve network layer; and wherein the reservation treatment unit includes a reservation context unit to give a same meaning to the reservation as other reservations in the domain in an event the reservation originates from inside the domain or to give a different meaning to the reservation as other reservations in the domain in an event the reservation originates from outside the domain.

12. The system of claim 11 further comprising a reallocation unit to reallocate network layer resources to the reservation from an at least one previously installed reservation in an event the reservation preempts the at least one previously installed reservation.

13. The system of claim 11 wherein the reservation context unit includes a preemption unit to compare the reservation to other reservations in the domain to determine whether the reservation, relative to the other reservations, preempts the other reservations.

14. The system of claim 13 further comprising a reallocation unit to reallocate network layer resources to the reservation from other reservations in the domain in an event the reservation preempts the other reservations.

15. The system of claim 11 wherein the reservation context unit includes a preference unit to compare the reservation to other reservations in the domain to determine whether the reservation, relative to the other reservations, is preferred over the other reservations.

16. The system of claim 15 further comprising an allocation unit to allocate network layer resources to the reservation over the other reservations in the domain in an event the reservation is preferred over the other reservations.

17. The system of claim 11 wherein the reservation context unit includes a discard unit to either: ignore the reservation and reserve network layer resources according to a default reservation or discard the reservation.

18. The system of claim 11 further comprising a policy decision point to manage reservation treatment and to communicate a policy of treating the reservation according to the domain of reservation treatment to at least one node within the domain.

19. The system of claim 11 wherein the policy decision point is a Common Open Policy Service (COPS) server.

20. A non-transitory computer-readable medium having stored thereon sequences of instructions, the sequences of instructions including instructions, which when executed by a digital processor perform the following steps:

treat a reservation for network layer resources according to a domain of reservation treatment to which the reservation belongs resulting in a treated reservation, the treated reservation is a request to reserve network layer resources;

give a same meaning to the reservation as other reservations in the domain in an event the reservation originates from inside the domain resulting in the treated reservation having a same meaning as the other reservations; and give a different meaning to the reservation as other reservations in the domain in an event the reservation originates from outside the domain resulting in the treated reservation having a different meaning as the other reservations.

* * * * *

UNITED STATES PATENT AND TRADEMARK OFFICE
CERTIFICATE OF CORRECTION

| | | |
|---|---|---|
| PATENT NO. | : 7,826,454 B2 | Page 1 of 1 |
| APPLICATION NO. | : 11/824585 | |
| DATED | : November 2, 2010 | |
| INVENTOR(S) | : James M. Polk and Subhasri Dhesikan | |

It is certified that error appears in the above-identified patent and that said Letters Patent is hereby corrected as shown below:

In Claim 11, column 22, line 13, after the word "domain" insert -- resources --.

Signed and Sealed this
First Day of February, 2011

David J. Kappos
*Director of the United States Patent and Trademark Office*